(12) United States Patent
Bathiche

(10) Patent No.: US 7,525,538 B2
(45) Date of Patent: Apr. 28, 2009

(54) USING SAME OPTICS TO IMAGE, ILLUMINATE, AND PROJECT

(75) Inventor: Steven N. Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 11/170,234

(22) Filed: Jun. 28, 2005

(65) Prior Publication Data

US 2006/0289760 A1    Dec. 28, 2006

(51) Int. Cl.
*G06F 3/042* (2006.01)

(52) U.S. Cl. .................................... 345/175

(58) Field of Classification Search ................ 345/175; 178/18.09
See application file for complete search history.

(56) References Cited

U.S. PATENT DOCUMENTS

| | | | |
|---|---|---|---|
| 4,992,650 A | | 2/1991 | Somerville |
| 5,319,214 A | * | 6/1994 | Gregory et al. ......... 250/504 R |
| 5,436,639 A | | 7/1995 | Arai |
| 5,483,261 A | | 1/1996 | Yasutake |
| 5,526,177 A | | 6/1996 | Fantone |
| 5,528,263 A | | 6/1996 | Platzker |
| 5,821,930 A | | 10/1998 | Hansen |
| 5,831,601 A | * | 11/1998 | Vogeley et al. .............. 345/175 |
| 5,835,692 A | | 11/1998 | Cragun |
| 5,900,863 A | | 5/1999 | Numazaki |
| 5,920,688 A | | 7/1999 | Cooper |
| 5,940,076 A | | 8/1999 | Sommers |
| 5,973,315 A | | 10/1999 | Saldana |
| 6,128,003 A | | 10/2000 | Smith |
| 6,154,214 A | | 11/2000 | Uyehara |

(Continued)

FOREIGN PATENT DOCUMENTS

EP    0690407    5/2004

(Continued)

OTHER PUBLICATIONS

"3.6 Interpolation in Two or More Dimensions," Numerical Recipes in C: The Art of Scientific Computing. Chapter 3. Interpolation and Extrapolation. © 1988-1992, Cambridge University Press. Numberical Recipes Software. pp. 123-128.

(Continued)

*Primary Examiner*—Amr Awad
*Assistant Examiner*—Liliana Cerullo
(74) *Attorney, Agent, or Firm*—Workman Nydegger

(57) ABSTRACT

A system for directing light in an interactive display system so as to perform multiple functions. In addition to projecting images on the interactive display system, the system is used to distribute infrared (IR) light onto the display surface, and/or to receive and focus received IR light reflected from a physical object on the display surface. A light separating system separates a multi-waveband light from a source into a predominantly visible light and a predominantly non-visible light, the latter being redirected around visible light modulators and recombined with the modulated visible light for projection onto the display surface by a lensing system. In addition, or in the alternative, the light separating system separates predominantly non-visible light reflected from an object adjacent to the surface, from light produced by the source, directing only the non-visible light received to the light sensor used to image the display surface.

16 Claims, 15 Drawing Sheets

U.S. PATENT DOCUMENTS

| | | | |
|---|---|---|---|
| 6,266,061 | B1 | 7/2001 | Doi |
| 6,340,119 | B2 | 1/2002 | He |
| 6,414,672 | B2 | 7/2002 | Rekimoto |
| 6,448,987 | B1 | 9/2002 | Easty |
| 6,469,722 | B1 | 10/2002 | Klinoe |
| 6,476,378 | B2 | 11/2002 | Nougaret |
| 6,520,648 | B2 | 2/2003 | Stark |
| 6,522,395 | B1 | 2/2003 | Barnji |
| 6,529,183 | B1 | 3/2003 | MacLean |
| 6,614,422 | B1 | 9/2003 | Rafli |
| 6,654,007 | B2 * | 11/2003 | Ito ............................. 345/175 |
| 6,690,363 | B2 | 2/2004 | Newton |
| 6,710,770 | B2 | 3/2004 | Tomasi |
| 6,720,949 | B1 | 4/2004 | Pryor |
| 6,750,877 | B2 | 6/2004 | Rosenberg |
| 6,781,069 | B2 | 8/2004 | Silverstein |
| 6,791,530 | B2 | 9/2004 | Vernier |
| 6,812,907 | B1 | 11/2004 | Gennetten |
| 6,840,627 | B2 | 1/2005 | Olbdrich |
| 6,959,102 | B2 | 10/2005 | Peck |
| 7,075,687 | B2 | 7/2006 | Lippert |
| 7,084,859 | B1 | 8/2006 | Pryor |
| 7,120,280 | B2 | 10/2006 | Biswas |
| 7,161,578 | B1 | 1/2007 | Schneider |
| 7,204,428 | B2 | 4/2007 | Wilson |
| 7,268,774 | B2 * | 9/2007 | Pittel et al. .................. 345/179 |
| 7,310,085 | B2 | 12/2007 | Holloway |
| 7,327,376 | B2 | 2/2008 | Shen |
| 2002/0006786 | A1 | 1/2002 | Mine |
| 2003/0161524 | A1 | 8/2003 | King |
| 2004/0005920 | A1 | 1/2004 | Soltys |
| 2004/0090524 | A1 | 5/2004 | Belliveau |
| 2004/0196371 | A1 | 10/2004 | Kono |
| 2005/0050476 | A1 | 3/2005 | SanGiovanni |
| 2005/0122306 | A1 | 6/2005 | Wilcox et al. |
| 2005/0122308 | A1 | 6/2005 | Bell |
| 2005/0226467 | A1 | 10/2005 | Hatano |
| 2005/0227217 | A1 | 10/2005 | Wilson |
| 2005/0245302 | A1 | 11/2005 | Bathiche |
| 2005/0277071 | A1 | 12/2005 | Yee |
| 2006/0010400 | A1 | 1/2006 | Dehlin |
| 2006/0034492 | A1 | 2/2006 | Siegel |
| 2006/0056662 | A1 | 3/2006 | Thieme |
| 2006/0092170 | A1 | 5/2006 | Bathiche |
| 2006/0244719 | A1 | 11/2006 | Brigham |
| 2007/0063981 | A1 | 3/2007 | Galyean |
| 2007/0126717 | A1 | 6/2007 | Cohen |
| 2007/0157095 | A1 | 7/2007 | Bilow |
| 2007/0279494 | A1 | 12/2007 | Aman |

FOREIGN PATENT DOCUMENTS

| | | |
|---|---|---|
| FR | 27656077 | 8/2003 |
| WO | 98/19292 | 5/1998 |

OTHER PUBLICATIONS

"Bar Code 1,2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://wwww.darmstadt.gmd.de/ambiente/activities/interactable.html. Printed Nov. 21, 2003 3pp.

Bier, Stone, Pier, Buston, and DeRose. "Toolglass and Magic Lenses: The See-Through Interface." Proceedings of Siggraph '93 (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 47-47.

"DiamondSpin—Begs for Direct Manipulation Technology Is it in the Pen? Sony Leaps Out-of-the-Box Again Pen with Gummi." Mitsubishi/DiamondSpin. CHI 2004#3. Printed Apr. 30, 2004. 5pp.

Dietz and Leigh, "DiamondTouch: A Multi=User Touch Technology." UIST '01 Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http:www.electron-cap.com/GiftCards.htm. Printed Jan. 20, 2004 and May 16, 2004. © 2003. 2pp. Total (3pp printed).

Fukuchi And Rekimoto. Interaction Tehcniques for SmartSkin.: ACM UIST2002 demonstration, 2002. 2 pp.

Grabowski, Robert. "A Miniature Vidwo Laser Range Finder for Small Robots." Available http://www.andrew.cmu.edu/~rig/research_hardware/laser_rangefinder.html. Printed May 16, 2004. 8pp.

Grant and Winograd. "Flexible, Collaborative Organization on a Tabletop." ACM CSCW 2002: Workshop on Co-located Tabletop Collaboration: Technologies and Directios. New Orleans, LA. Nov. 2002. pp. 1-4.

Horn, Berthold K.P. "Robot Vision." The MIT Press. Available http://mitpress.mit.edu/catalog/item/default.asp?ttype=2&tid=8388. Printed Dec. 17, 2003. 6pp. Total.

Horn, Berthold Klaus Paul. "Robot Vision." Binary Images: Topological Properties. The MIT Electrical Engineering and Computer Sciene Seriese. 1986. pp. 66-71 an cover pages(s).

Hunter, Anderw. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

IR Distance Sensor.: Available http://www.diyelectronics.com/Accessories/IRDS.html (2pp) and http://www.diyelectronics.com/Accessories/GP2D05.html (1pg.). Printed Dec. 30, 2003. 3pp.

"Tangible Bits: Towards Seamless Interfaces between People, Bits and Atoms." Proceedings of CHI '97, Mar. 22-27, 1997, Atlanta, Georgia © 1997 ACM 0-89791-802-9/97/03. pp. 1-8.

Ishii, Wisneski, Orbanes, Chun, and Paradiso. "PinPongPlus: Design of an Athletic-Tangible Interface for Computer-Supported Cooperative Play." Proceedings of CHI '99, May 15-20, 1999 © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." Extended Abstracts of CHI 2001, Seattle. Apr. 2001 pp. 269-270.

Kang, Sing Bing. "Radial Distortion Snakes." IAPR Workshop on Machine Vision Applications (MVA2000), Tokyo, Japan. Nov. 2000. pp. 603-606.

Klemmer, Newman, and Sapien. "The Designer's Outpost: A Task-Centered Tangible Interface for Web Site Information Design." Proceedings of Human Factors in Computing Systems: CHI 2000 Extended Abstracts. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." CHI Letters, The 14th Annual ACM Symposium on User Interface Soft Technology: UIST 2001. 3(2). pp. 1-10.

Kobayashi, Hirano, Narita, and Ishi. "A Tangible Interface for IP Network Simulation." CHI 2003, Apr. 5-10, 2003, F. Lauderdale, FL ACM 1-58113-630-7/03/0004. 2pp.

Koike, Sato, and Kobayashi. "Integrating Paper and Digital Information on EnhanceDesk: A Method for Reltime Finger Tracking on an Augmented Desk System." ACM Transaction on Computer-Human Interaction, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." Proceedings of the IEEE Virtual Relaity 2000 Conference, Mar. 18-22, 2000. New Brunswich, New Jersey: IEEE Computer Society, 2000. 8pp.

Leigh and Dietz "DiamondTouch Characteristics and Capabilities." Mitsubishi Electric Research Laboratories, Cambridge, Massachusetts, USA. Undated. 2pp. Magerkurth, Stenzel, and Prante.

"STARS—A Ubiquitous Computing Platform fo rComputer Augmented Tabletop Games." 5th International Conference on Ubiquitous Computing (Ubicomp '03), Oct. 12-15, 2003, Seattle, Washington. 2 pp.

Malandain, Gregoire. "Connected Components Extraction." Available http://www-sop.inria.fr/epidaure/personnel/malandai/segment/connese.html. Printed Dec. 18, 2003. 3pp.

Matsushita and Rekimoto. "HoloWall; Designing a Finger, Hand, Body, and Object Sensitive Wall." UIST '97 Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." Proceedings of UIST 2002, Oct. 27-30, 2002. © 2002 ACM. 10pp.

Paradiso, Hsiao, Strickon, Lifton, and Adler. "Sensor systems for interactive surfaces." IBM Systems Journal, vol. 39, Nos. 3&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002 6pp.

Ramos and Balakrishnan. "Fluid Interaction Techniques for the Control and Annotation of Digital Video." UIST '03 Vancouver, B.C., Canada. © 2003 ACM 1-58133-636-06/03/0010. pp. 105-114.

Rekimoto and Ayatsuka "CyberCode: Designing Augmented Reality Environments with Visual Tags." Proc. Of UIST 2000, 2000. 10pp.

Rekimoto and Matsushita. "Perceptual Surfaces :Towards a Human and Object Sensitive Interactive Display." Proceedings of Workshop on Perceptural User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Continuous Work Space for Hybrid Computing Environments." CHI '99, May 15-20, 1999. Pittsburgh, Pennsylvania. © ACM 0-201-48559-1/99/05. pp. 378-385.

Rekimoto, Jun. "Matrix: A Realtime Object Identification and Reistration Method for Augmented Reality." Proc. Of Asia Pacific Computer Human Interaction (APCHI '98), 1998. 6pp.

Rekimoto, Jun. "Multiple-Computer User Interfaces: 'Beyond the Desktop' Direct Manipulation Environments." ACI CHI2000 Video Proceedings, 2000. 2pp.

Rekimoto, Jun. "Pick-and-Drop: A Direct Manipulation Technique for Multiple Computer Environments." Proceedings of UIST'97, 1997. pp. 31-39.

Rekimoto, Jun. "SmartSkin: An Infarastructure for Freehand Manipulation on Interactive Surfaces." CHI 2002, Apr. 20-25, 2002, Minneapolis, Minnesota. © ACM 1-58113-453-3/02/0004. 8pp.

Rekimoto, Ullmer, and Oba. "Data Tiles: A Modular Platform for Mixed Physical and Graphical Interactions." SIGCHI'01, Mar. 31-Apr. 4, 2001, Seattle, WA. © 2001 ACM 1-58113-327-8/01/0003. 8pp.

Reznik, Canny, and Alldrin. "Leaving on a Plane Jet." 2001 Int. Conf. on Intell. Robots & Systems (IROS), Maui, Hawaii, Oct. 2001. 6pp.

Ringel, Gerh, Jin, and Winograd. "Barehands: Implement-Free Interaction with a Wall-Mounted Display." Short Talk. CHI Mar. 31-Apr. 5, 2001 pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." Home>Reviews, TablePCHome.com—Table PC user community. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at 1999 ACM Symposium on Interactive 3D Graphics (I3DG '99). Apr. 26-28, 1999, Atlanta, GA. 7pp.

Scott, Grant, and Mandryk. "System Guidelines for Co-located collaborative Work on a Tabletop Display." Proceedings of ECSCW'03, European Conference Computer-Supported Cooperative Work 2003, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." Interactions. Mar.+ Apr. 2003. pp. 15-22.

Shen, Lesh, Bernier, Forlines, and Frost. "Sharing and Building Digital Group Histories." CSCW'02, Nov. 16-20, 2002, New Orleans, Louisiana. © 2002 ACM 1-58113-560-2/02/0011. 10pp.

Shen, Lesh, and Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." CHI 2004, Apr. 24-29, 2004, Vienna, Austria. © ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board TM Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.Edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." Proceedings of the ACM Conference on Human Factors in Computing Systems (CHI'99), Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." Pen Computing Magazine: Tablet PC. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." Proceedings of the 14. Annual ACM Symposium on User Interface Software and Technoic (USIT'01), ACM Press (CHI Letters 3(2)), 2001, pp. 11-20 (10pp).

Ullmer and Ishii. "The metaDESK: Models and Prototypes for Tangible User Interfaces." Proceedings of UIST'97, Oct. 14-17, 1997. © 1997 ACM—ACM 0-89791-881-9/97/10. 10pp.

Ullmer, Ishii and Glas. "mediaBlocks: Physical Containers, Transports, and Controls for Online Media." Computer Graphics Proceedings (SIGGRAPH'98), Jul. 19-24, 1998, © 1998 ACM. ACM-0-89791-999-8 8/98/007. 8pp.

Ullmer, Ishii and Jacob. "Tangible query Interfaces: Physically Constrained Tokens for Manipulating Database Queries." Proc. INTERACT 2003 Conference, 2003. 11pp.

Underkoffler and Ishii. "Illuminating Light: An Optical Design Tool with a Luminous-Tangible Interface." Proceeding of CHI '98, Apr. 18-23, 1998, © 1998 ACM. pp. 1-8.

Underkoffler and Ishii. "Urp: A Luminous-Tangible Workbench for Urban Planning and Design." Proceedings of CHI '99. May 15-20, 1999. © 1998 ACM. pp. 1-8.

Underkoffler Ullmer, and Ishii. "Emancipated Pixels: Real-World Graphics in the Luminous Room." Proceedings of SIGGRAPH '99, Aug. 8-13, 1999, © 1999 ACM. 8pp.

Vernier, Lesh and Shen. "Visualization Techniques for Circular Tabletop Interfaces." To appear in Advanced Visual Interfaces, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VirtualBoard." Available http://visilab.unime.it/visilab/virtualboard.htm. Printed Dec. 16, 2003. 6pp.

Von Hardenberg and Bérard. Bare-Hand Human-Computer Interaction. PUI 2001 Orlando, FL, © 2001 ACM 1-58113-448-7-11/14/01. 8pp.

Wellner, Pierre. "Interacting with Paper on the DigitalDesk." Communications of the ACM. Jul. 1993. EuroPARC tech report EPC-93-195. 17pp.

Whalen, Tara. "Playing well with Others: Applying Board Game Design to Tabletop Display Interfaces." UIST 2003. Vancouver, Nov. 2-5, 2003, 3pp.

Wu and Balakrishnan. "Multi-Finger and Whole Hand Gestural Interaction Techniques for Multi-User Tabletop Displays." UIST '03, Vancouver, B.C., Canada. © 2003 ACM 1-58113-636-6/03/0010. pp. 193-202.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2., Jun. 2000, pp. 78-80.

"The Tracking Cube: A Three Dimensional Input Device" IBM Techincal Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2 pp.

Department of Defence, Department of Defence Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Notice of Allowance dated Oct. 8, 2008 cited in U.S. Appl. No. 10/880,167.

Notice of Allowance Dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

U.S. Appl. No. 12/110,032, filed May 04, 2006, Bathiche.

U.S. Appl. No. 12/106,910, filed Apr. 21, 2008, Wison.

Northop Grumman "TouchTable™" Brochure ©2005 Northop Grumman Space & Mission Systems Corp. RS1190705. 2PP.

Department of Defence, Department of Defence Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Office Action mailed Jun. 29, 2007 cited in related U.S. Appl. No. 10/834,645.

Office Action dated Aug. 30, 20007 cited in related U.S. App. No. 10/870,777.

Office Action dated Dec. 13, 2007 cited in related U.S. App. No. 10/834,675.

Office Action dated Oct. 9, 2007 cited in related U.S. App. No. 10/867,434.

Notice of Allowance dated Feb. 28, 2008 cited in related U.S. Appl. No. 10/870,777.

Notice of Allowance dated Mar. 28, 2008 cited in related U.S. Appl. No. 10/834,675.

Notice of Allowance mailed Feb. 27, 2008 cited in related U.S. Appl. No. 10/814,761.

Office Action dated Mar. 25, 2008 cited in related U.S. Appl. No. 10/880,167.

Notice of Allowance dated Apr. 23, 2008 cited in related U.S. Appl. No. 10/969,746.

Office Action dated Jun. 12, 2008 cited in related U.S. Appl. No. 11/117,979.

Office Action dated Oct. 9, 2007 cited in related U.S. Appl. No. 10/813,855.

Office Action dated May 7, 2008 cited in related U.S. Appl. No. 10/813,855.

Office Action dated Jun. 26, 2008 cited in related U.S. Appl. No. 11/364,319.

Office Action dated Jul. 10, 2008 cited in related U.S. Appl. No. 10/867,434.

Office Action dated Feb. 8, 2008 cited in related U.S. Appl. No. 11/321,551.

Office Action dated Aug. 19, 2008 cited in related U.S. Appl. No. 11/321,551.

Notice of Allowance dated Oct. 16, 2007 cited in U.S. Appl. No. 10/814,761.

Office Action dated Aug. 29, 2008 cited in related U.S. Appl. No. 10/870,777.

* cited by examiner

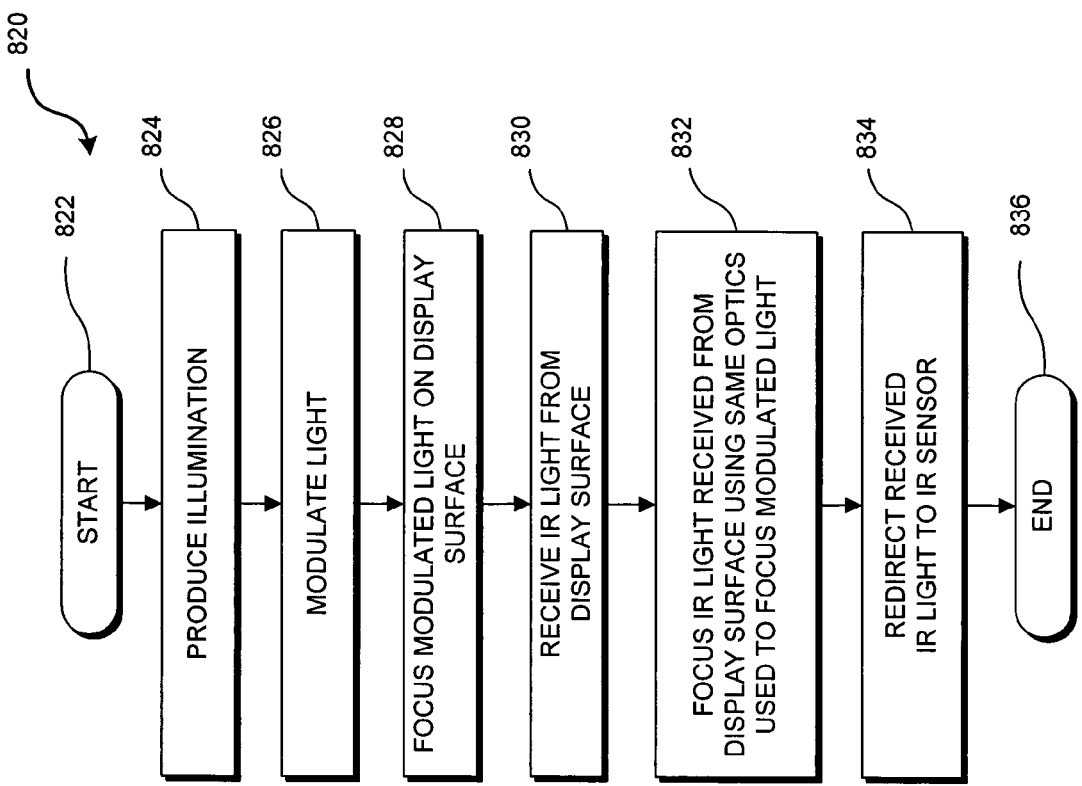
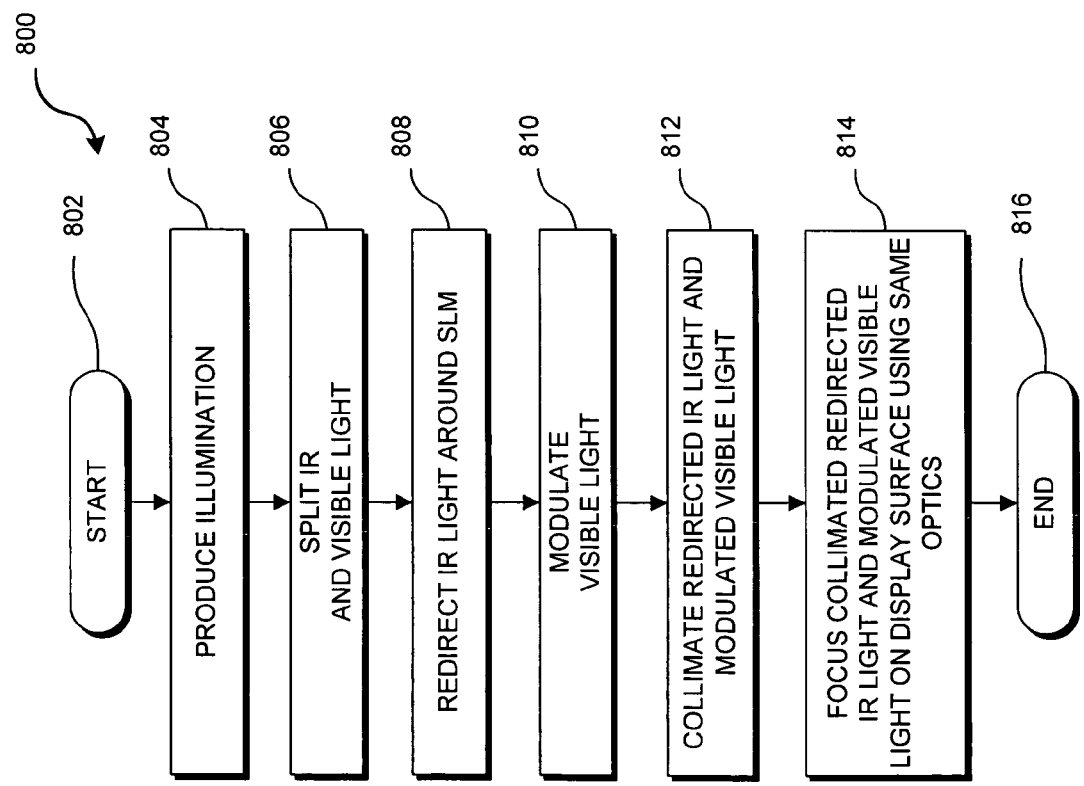

USING SAME OPTICS TO IMAGE, ILLUMINATE, AND PROJECT

BACKGROUND

As computers become more ubiquitous throughout our environment, the desire to make computers and their interfaces even more user friendly continues to promote development in this area. For example, the MIT Media Lab, as reported by Brygg Ullmer and Hiroshi Ishii in "The meta-DESK: Models and Prototypes for Tangible User Interfaces," *Proceedings of UIST*10/1997:14-17," has developed another form of "keyboardless" human-machine interface. The meta-DESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface.

By detecting a specially formed object or IR-reflected light from an object disposed on a graphical display surface, the metaDESK can respond to the contemporaneous placement and movement of the object on the display surface to carryout a predefined function, such as displaying and moving a map of the MIT campus.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

The interactive display systems described above, as well as other interactive display systems, generally employ separate optical systems for each of three different purposes. A first optical system is used to project images and data onto the display surface. A second optical system is used to evenly distribute IR light over the display surface to illuminate physical objects disposed adjacent to the display surface. A third optical system is used to receive and focus IR light reflected or generated by physical objects disposed adjacent to the display surface to detect user inputs.

Understandably, using multiple optical systems to carry out these functions adds bulk and cost to an interactive display system. In addition, using multiple, separate optical systems typically requires steps to be taken to correct for any misalignment of the respective images between the different optical systems. For example, if the image projected by the first optical system onto the display surface with which the user will interact is not aligned with the third optical system that is imaging the IR light produced by the user's inputs, the resulting projected and imaged input will be offset from each other. It will thus be necessary to correct for the offset to avoid errors in interpreting the user input relative to the projected image to which the user's input is directed. Conventional interactive systems of this type do not provide an efficient approach to avoid this problem.

SUMMARY

One of the advantages of the present invention is that it provides cost and/or space savings by using an optical system in a display surface to serve multiple purposes or functions. By selectively redirecting and/or filtering spectral components of a light source used to generate images, the same light source and lensing device can be used both to project images on the display surface and evenly distribute IR light to detect potential user inputs. As a further option, the same lensing device used to project images on the display surface may be used to image the display surface to identify user inputs. Because the lensing device used to project images on the display surface typically is a high quality, and often relatively costly device, using the same lensing system to distribute IR light and/or receive and focus received IR light saves the cost and bulk of providing additional lensing systems for these other purposes. Further, because lensing systems devoted to the distribution of IR light and/or receiving the received IR light tend to be of lower quality to save cost and/or space, the quality of the distribution of the IR light and/or the display surface are increased. Thus, the overall quality of the optics employed in the display surface is used to good advantage for all functions provided by the optical system, while both the additional cost and bulk associated with using multiple separate optical systems is avoided.

One aspect of the present invention is thus directed to a system for directing light in an interactive display system, where the interactive display system includes a generally transparent planar panel having a first surface on which visible images are projected and a second surface opposite the first surface facilitating user interaction by one of placing an object and performing a gesture adjacent the second surface. A lensing device is operable to focus a predominantly visible light output to project an image on the first surface and distribute a predominantly non-visible light output over the first surface and/or focus light received from the second surface, where the light received is focused to a focal input of a light sensor. A light separating system is operable to separate an input light into a predominantly visible light input and a predominantly non-visible light input. The predominantly visible light input is selectively modulated by a modulating system to generate the predominantly visible light output that is directed to the lensing system. At least a portion of the predominantly non-visible light input is directed to the lensing system as the predominantly non-visible light output. In addition, or in the alternative, the light separating system is operable to separate predominantly non-visible received light from all received light such that only the predominantly non-visible received light is routed to the light sensor.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

BRIEF DESCRIPTION OF THE DRAWING FIGURES

Various aspects and attendant advantages of one or more exemplary embodiments and modifications thereto will become more readily appreciated as the same becomes better understood by reference to the following detailed description, when taken in conjunction with the accompanying drawings, wherein.

Figure 8C:
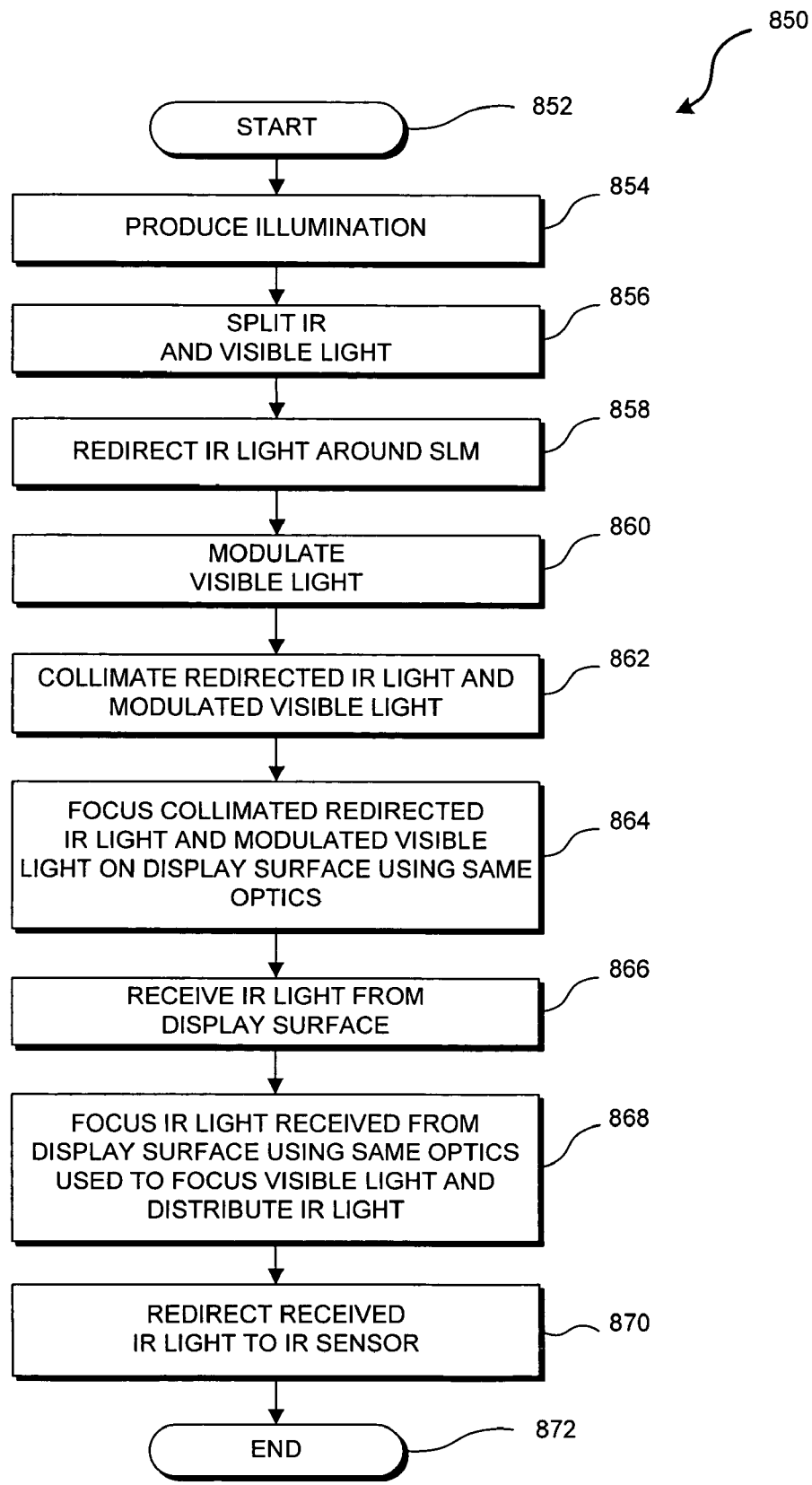
Figure 9:
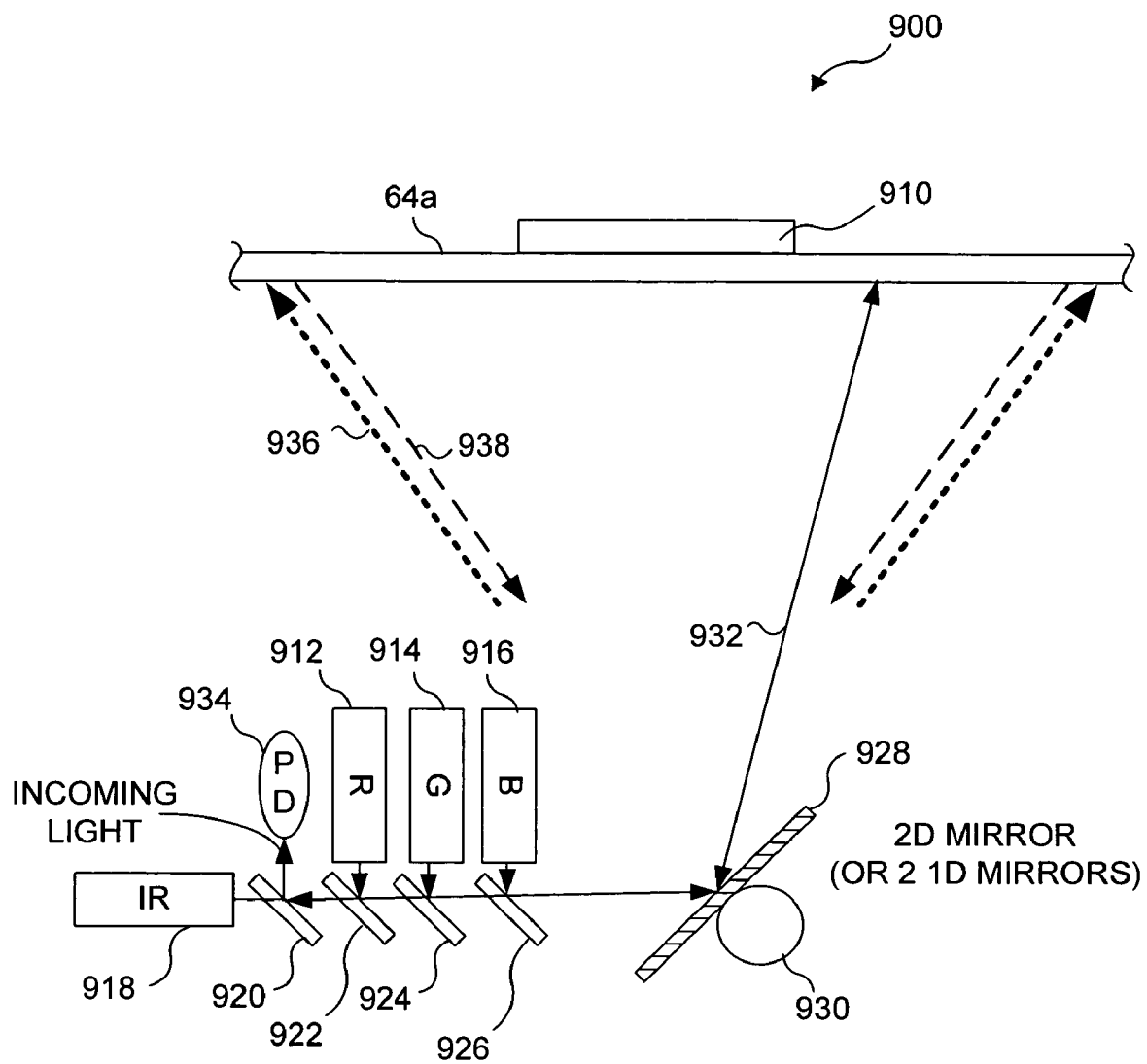

FIGS. 8A-8C are flow diagrams illustrating the logical steps for exploiting optical systems used for projecting images on a display surface, distributing IR light over the display surface, and/or imaging the display surface to detect user inputs; and FIG. 9 illustrates an exemplary embodiment of a display surface that is illuminated with IR light and with an image projected by three different color modulated lasers using a scanning mirror, IR light reflected by any object proximate the display surface being reflected back along the same axis as the scanned light beams and detected by a photodiode.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Exemplary Interactive Surface Using Multiple Optical Systems

Figure 1A:
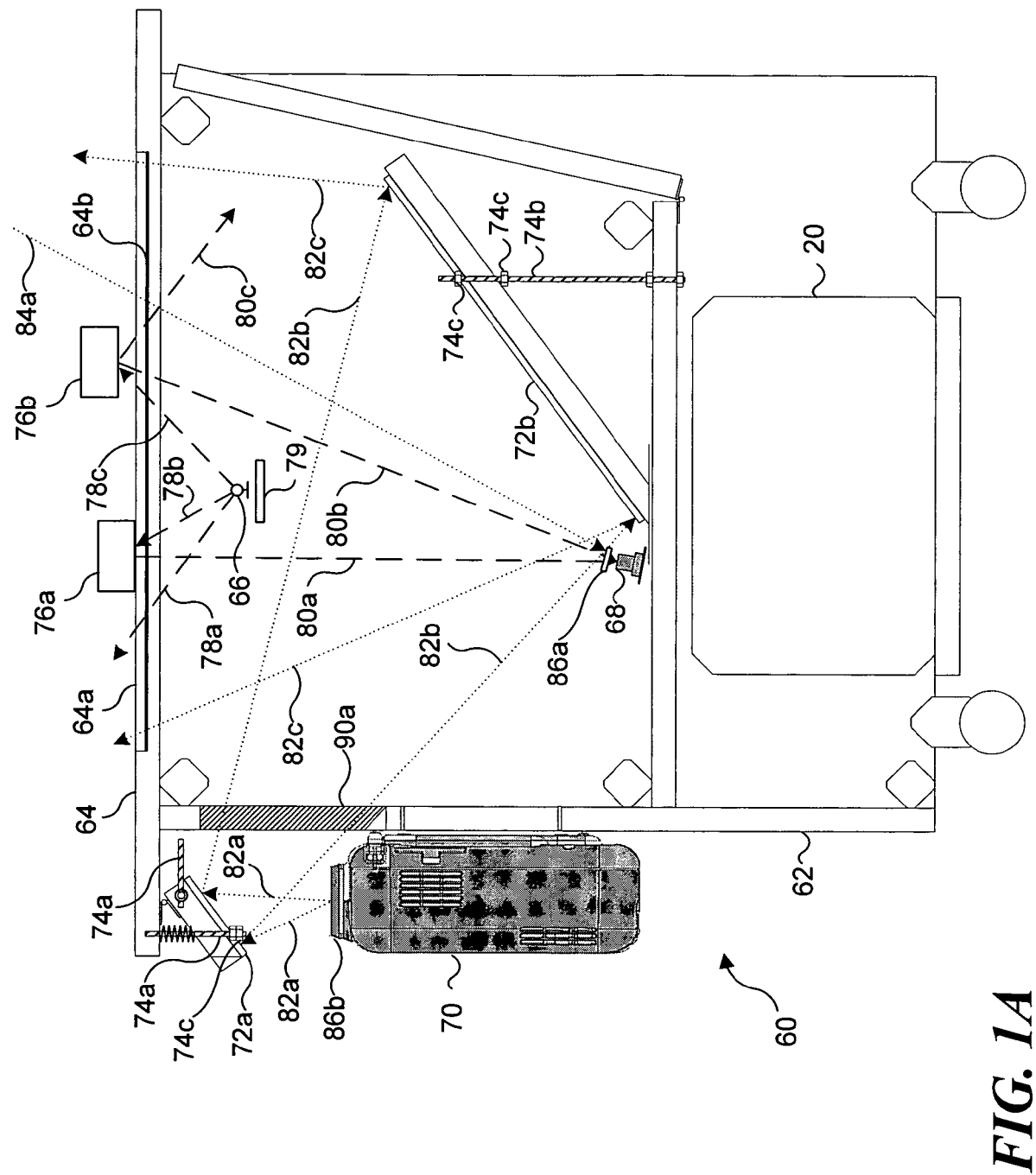
FIG. 1A is a cross-sectional view illustrating internal components of a display surface in the form of an interactive table that includes an integral PC.

In FIG. 1A, an exemplary interactive display table 60 is shown that includes the PC 20 within a frame 62 and which serves as both an optical input and video display device for the computer. In this cut-away figure of the interactive display table 60, rays of light 82a-82c used for displaying text and graphic images are generally illustrated using dotted lines, while rays of IR (IR) light used for sensing objects on or just above a display surface 64a of the interactive display table 60 are illustrated using dash lines. The display surface 64a is set within an upper surface 64 of interactive display table 60. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. As used herein, and in the claims that follow, in connection with objects positioned on or proximate to the display surface, the term "adjacent to" is used with the intention that this term encompass both an object that is actually touching the display surface as well as one that is just above or proximate the display surface. Although only one IR source 66 is shown, it will be appreciated that a plurality of such IR sources may be mounted at spaced-apart locations around the interior sides of frame 62 to prove an even illumination of display surface 64a.

The IR light produced by the IR sources may:

exit through the table surface without illuminating any objects, as indicated by dash line 78a;

illuminate objects actually on the table surface, as indicated by dash line 78b; or illuminate objects a short distance above or proximate the table surface but not touching the table surface, as indicated by dash line 78c.

Objects above display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. The digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display, including ambient IR light that also travels along the path indicated by dotted line 84a.

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to display surface 64a will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention. An interactive display system, such as illustrated in FIG. 1A, is operable to recognize an object and/or its position relative to the display surface 64a by detecting its identifying characteristics using the IR light reflected from the object.

Figure 1B:
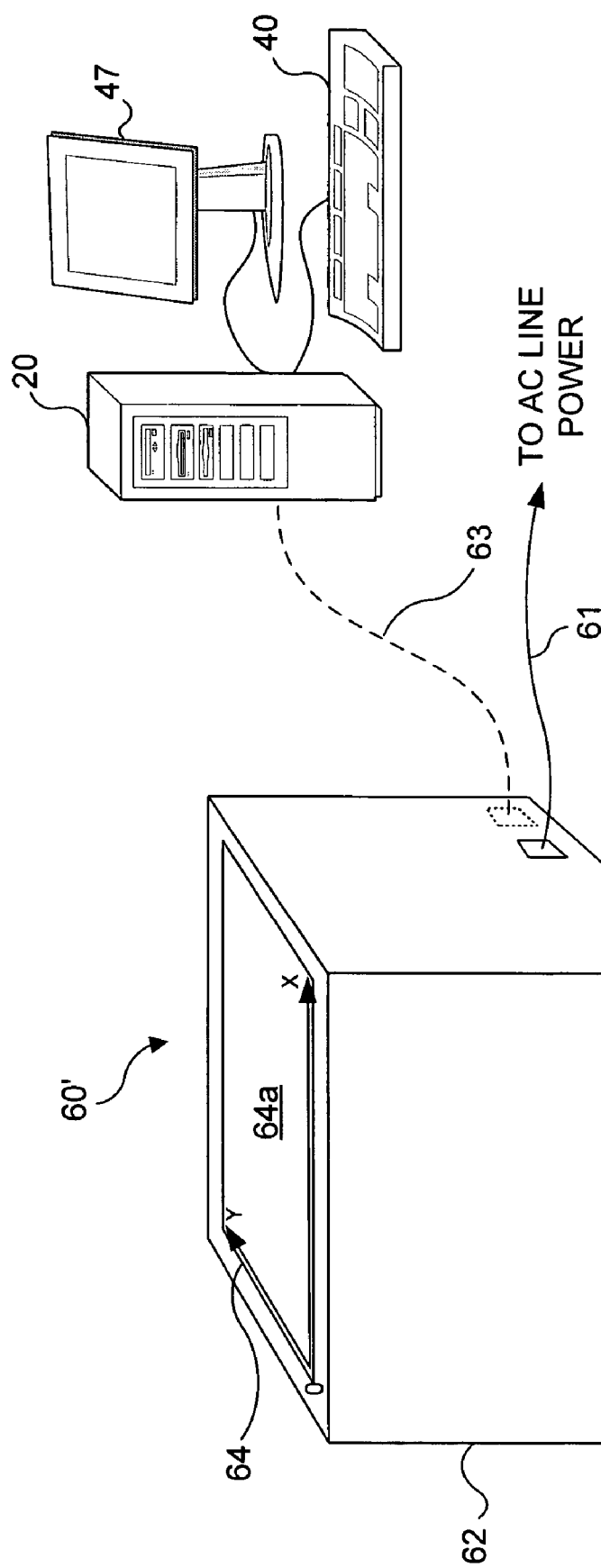
FIG. 1B is an isometric view of an embodiment in which the interactive table is connected to an external PC.

PC 20 may be integral to interactive display table 60 as shown in FIG. 1A, or alternatively, may instead be external to the interactive display table, as shown in the embodiment of FIG. 1B. In FIG. 1B, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If an interactive display table 60' is connected to an external PC 20 (as in FIG. 1B) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable a user interaction with the graphic image or virtual environment visible on display surface 64a and identify objects that are resting atop the display surface, such as an object 76a, or are hovering just above it, such as an object 76b.

Again referring to FIG. 1A, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the display surface, physical objects may be placed adjacent to the display surface by placing the physical objects in contact with the display surface, or otherwise adjacent to the display surface.

The logical steps implemented to thus, detect and identify an object and its orientation are explained in the commonly-assigned patent applications, including application Ser. No. 10/814,577 entitled "Identification Of Object On Display surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference.

As alluded to by the title of the second referenced application, a display surface as described in FIG. 1A desirably employs a form of offset correction. As described, users may interact with images projected by video projector 70. Such interaction is detected as a result of IR light generated by IR source 66 and imaged by a video camera. So as not to interfere with the projected light from video projector 70, or be interfered with by IR source 66, the video camera is positioned offset and out of the direct line of sight of the projector and the IR source. As a result, the video camera receives an offset image, which can skew how video camera 68 interprets user inputs. While it is possible to correct for skew, the correction process can cause loss of image resolution and detail, especially in the corners of the image, where objects tend to be more out of focus.

Figure 1C:
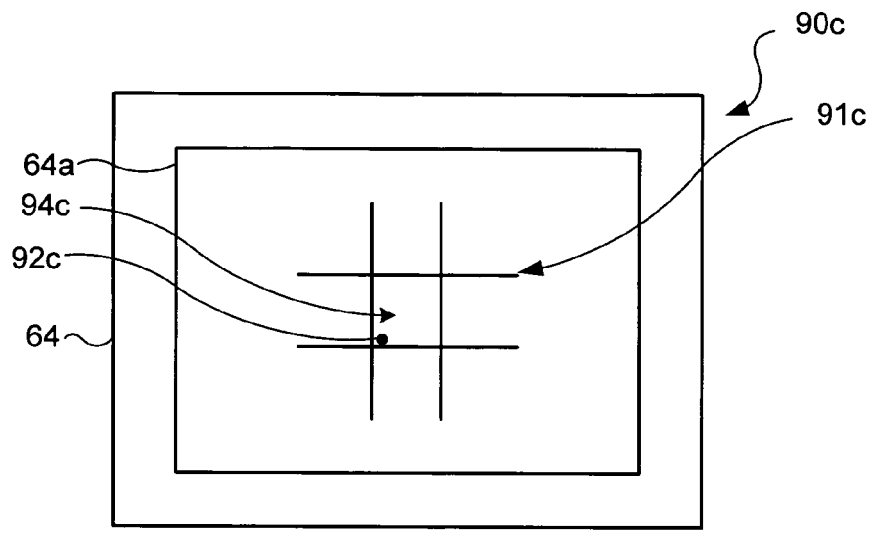
FIG. 1C is an example of an image received in a system where the video camera is centered under the display surface.
Figure 1D:
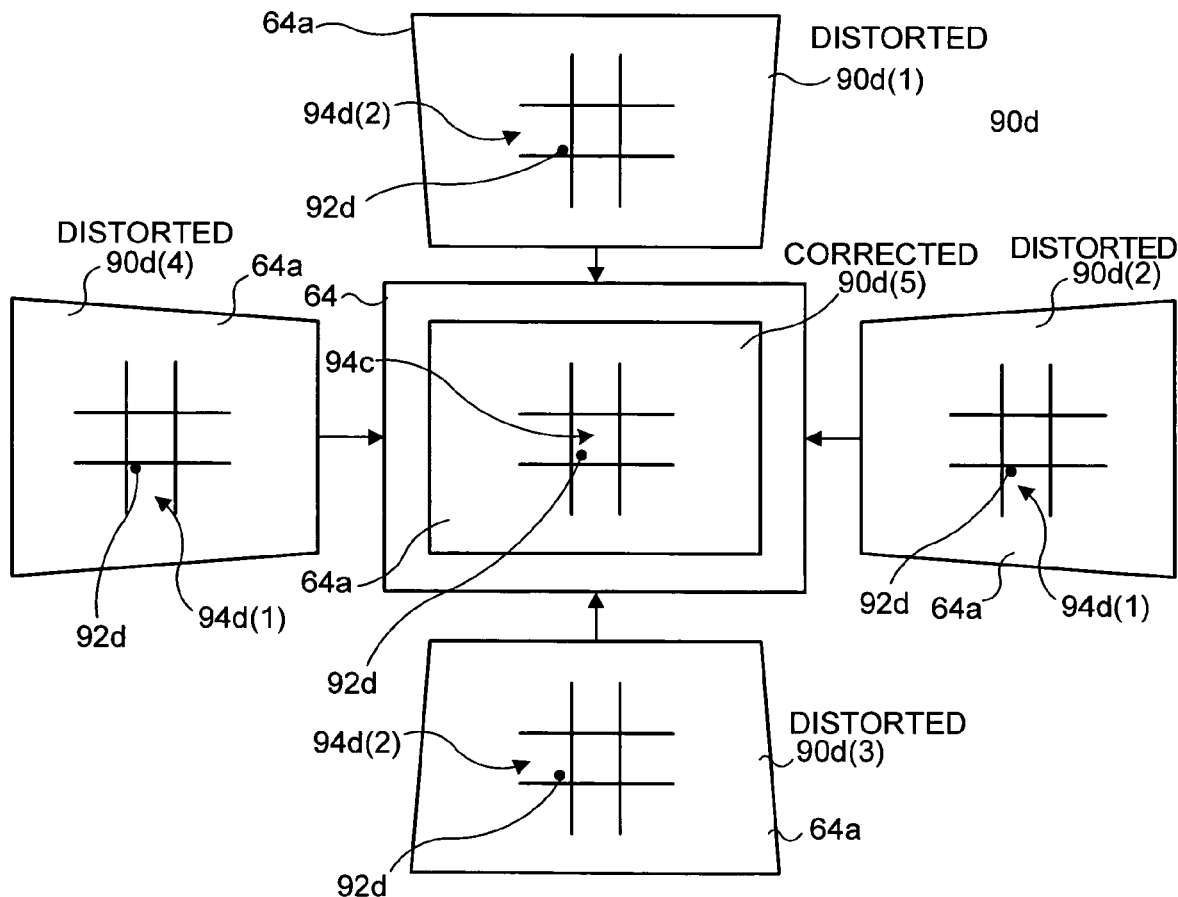
FIG. 1D is an example of an inaccurately received image in the system of FIG. 1A resulting from the offset position of the video camera.

For example, FIG. 1C shows a camera image 90c of the underside of upper surface 64 and display surface 64a, as the view would appear if video camera 68 were centered directly under display surface 64a. A point 92c resulting from a user input is detected relative to a coordinate system 91c. With the video camera centered beneath display surface 64a, point 92c is correctly identified to be in quadrant 94c. However, as shown in FIG. 1D, positioning the video camera at an offset position so that it is not on the vertical centerline extending through the display surface may skew the results, causing one side of the received image to be relatively longer than an opposite side, and causing the other two sides to be non-parallel, in one of four distorted images 90d(1)-90d(4), which are illustrated around a corrected image 90d(5). Depending on the offset position of the video camera relative to the center of the display surface, the distorted image will typically correspond to one of these four distorted images 90d(1)-90d(4). There can also be spherical aberration, although not shown in this Figure.

In FIG. 1D camera images 90d(1)-90d(4) of display surface 64a appear distorted relative to upper surface 64. Further a point 92d, which corresponds to point 92c in FIG. 1C, now incorrectly appears in one of quadrant 94d(1) or quadrant 94d(2) instead of 94c, as shown in corrected center image 90d(5). Thus, positioning the camera at an offset position may be useful and necessary, so as to avoid interference between the optical devices. However, in such a case, image processing may be required to correct the offset, adding a computational burden to the image processing system. Distortions occurring as a result of misalignment of the video camera with the center is called keystone. In keystone, the distortions give rise to spherical aberrations and focusing issues, which lead to a loss of resolution, so that either a higher resolution sensor must be used to achieve the desired performance or the performance specifications must be reduced.

Exemplary Computing System for Implementing Present Invention

Figure 2:
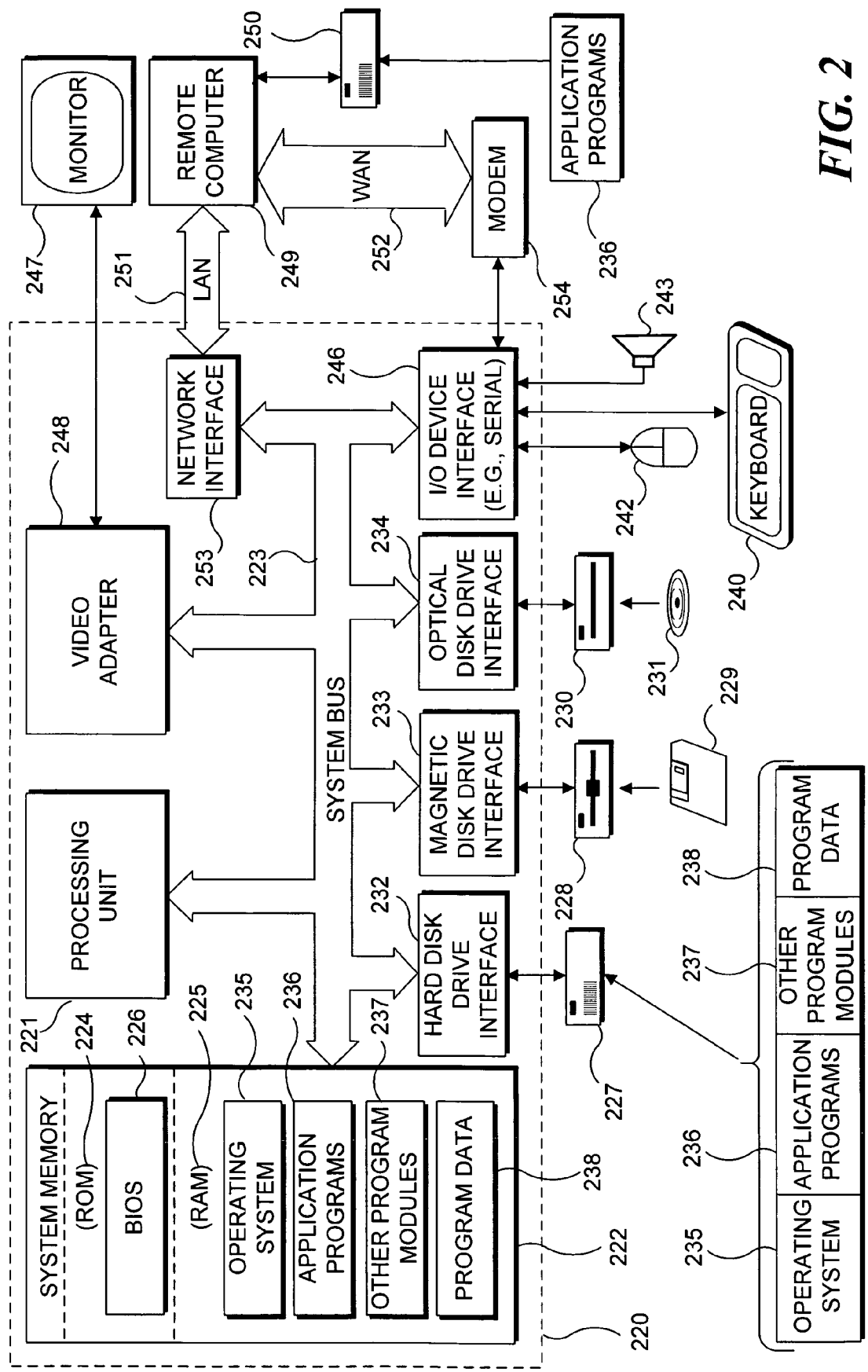
FIG. 2 is a functional block diagram of a generally conventional computing device or personal computer (PC) that is suitable for use with a display surface.

With reference to FIG. 2, an exemplary conventional computing system suitable for use with an embodiment of the present invention is shown. The computing system includes a general purpose computing device in the form of a PC 220, provided with a processing unit 221, a system memory 222, and a system bus 223. The system bus couples various system components including the system memory to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system 226 (BIOS), containing the basic routines that help to transfer information between elements within the PC 220, such as during start up, is stored in ROM 224. PC 220 further includes a hard disk drive 227 for reading from and writing to a hard disk (not shown), a magnetic disk drive 228 for reading from or writing to a removable magnetic disk 229, and an optical disk drive 230 for reading from or writing to a removable optical disk 231, such as a compact disk-read only memory (CD-ROM) or other optical media. Hard disk drive 227, magnetic disk drive 228, and optical disk drive 230 are connected to system bus 223 by a hard disk drive interface 232, a magnetic disk drive interface 233, and an optical disk drive interface 234, respectively. The drives and their associated computer readable media provide nonvolatile storage of computer readable machine instructions, data structures, program modules, and other data for PC 220. Although the exemplary environment described herein employs a hard disk, removable magnetic disk 229, and removable optical disk 231, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 229, optical disk 231, ROM 224, or RAM 225, including an operating system 235, one or more application programs 236, other program modules 237, and program data 238. A user may enter commands and information in PC 220 and provide control input through input devices, such as a keyboard 240 and a pointing device 242 that communicate with system bus 223 via I/O device interface 246. Pointing device 242 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. One or more audio input/output devices 243, including headsets, speakers, and microphones, also engage personal computer 220 via I/O device interface 246. Still further input devices (not shown) may include a joystick, haptic joystick, yoke, foot pedals, game pad, satellite dish, scanner, or the like. These and other input/output (I/O) devices are often connected to processing unit 221 through an I/O interface 246 that is coupled to the system bus 223. The term I/O interface is intended to encompass each interface specifically used for a serial port, a parallel port, a game port, a keyboard port, and/or a universal serial bus (USB). While not required when PC 220 is coupled to the interactive display table, a monitor 247 is also optionally connected to system bus 223 via an appropriate interface, such as a video adapter 248. It will be appreciated that PCs are often coupled to other peripheral output devices (not shown), such as speakers (through a sound card or other audio interface—not shown) and printers.

PC 220 can also operate in a networked environment using logical connections to one or more remote computers, such as a remote computer 249. Remote computer 249 may be another PC, a server (which is typically generally configured much like PC 220), a router, a network PC, a peer device, or a satellite or other common network node, and typically includes many or all of the elements described above in connection with PC 220, although only an external memory storage device 250 has been illustrated in FIG. 2. The logical connections depicted in FIG. 2 include a local area network (LAN) 251 and a wide area network (WAN) 252. Such networking environments are common in offices, enterprise wide computer networks, intranets, and the Internet.

When used in a LAN networking environment, PC 220 is connected to LAN 251 through a network interface or adapter 253. When used in a WAN networking environment, PC 220 typically includes a modem 254, or other means such as a cable modem, Digital Subscriber Line (DSL) interface, or an Integrated Service Digital Network (ISDN) interface for establishing communications over WAN 252, such as the Internet. Modem 254, which may be internal or external, is connected to the system bus 223 or coupled to the bus via I/O device interface 246, i.e., through a serial port. In a networked environment, program modules, or portions thereof, used by PC 220 may be stored in the remote memory storage device. IR will be appreciated that the network connections shown are exemplary and other means of establishing a communications link between the computers may be used, such as wireless communication and wide band network links.

System Using the Same Optical System to Project Images and Distribute IR Light

Figure 3A:
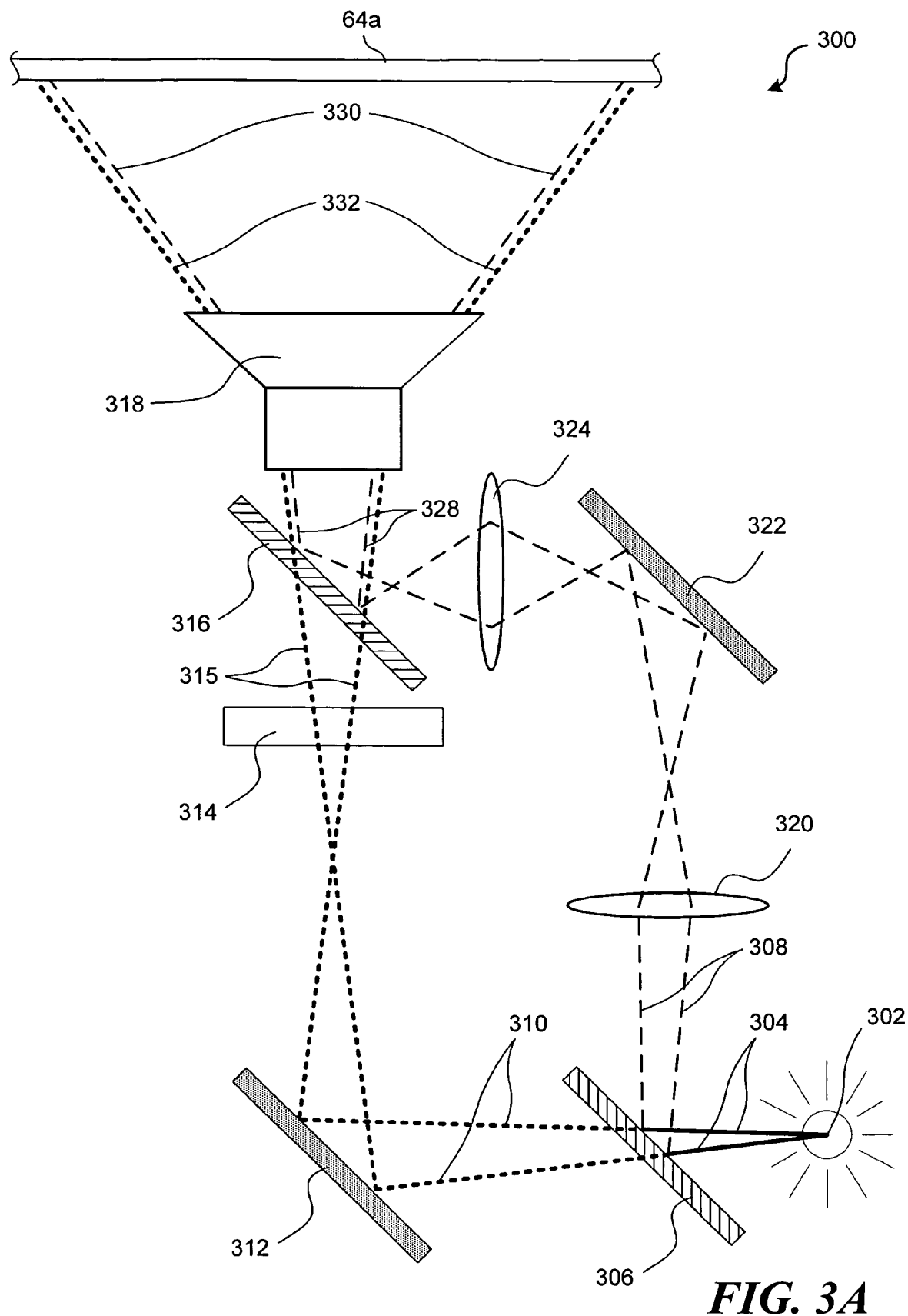
FIGS. 3A-3C illustrate exemplary modes of a display surface in which optical systems used to project images on the display surface and distribute IR over the display surface are combined into a single optical system.

Exemplary system 300 of FIG. 3A illustrates how an optical system used in a display surface can be employed to perform two functions, in this case, projecting images on display surface 64a, while distributing IR light over display surface 64a to detect a user input or objects adjacent to the display surface.

System 300 includes a light source of 302 generating multi-spectral light 304 that, like most electrical light sources, includes wavelengths in both the visible and IR wavebands or spectra. Multi-spectral light 304 falls on a "hot mirror" 306. A "hot" mirror or a "cold" mirror is simply a supporting substrate, such as glass, having a coating that is selected to either reflect or transmit light within a specific region in the light spectrum. Thus, hot mirror 306 is configured to reflect IR light 308 while transmitting visible light 310. The visible light 310 passing through hot mirror 306 is reflected by a mirror 312 toward a spatial light modulator 314. Spatial light modulator 314 suitably includes a transmissive liquid crystal display (LCD) modulator, a light grating valve, or a similar modulating device (none separately shown) operable to selectively modulate visible light 310 in order to create projectable images. Resulting modulated visible light 315 is incident on a second hot mirror 316, which passes modulated visible light 315 to a lensing device 318. Lensing device 318 focuses modulated visible light 315, to generate focused visible light 332 that is directed onto display surface 64a.

IR light 308 reflected by hot mirror 306 is, if necessary, focused by a lens 320 configured to control the dispersion of IR light 308. After passing through lens 320, IR light 308 is reflected by a mirror 322 toward second hot mirror 316. If necessary, an additional lens 324 is positioned between mirror 322 and hot mirror 316 to further control dispersion of IR light 308. Hot mirror 316, while configured to pass visible light, reflects IR light 308 to complete the channeling of redirected IR light 328 toward lensing system 318. Lensing system 318 thus projects both focused visible light 332 and focuses redirected IR light 328 (as distributed IR light 330) onto display surface 64a.

It should be appreciated that, although most lensing devices may include coatings to reject or suppress IR light, embodiments of the present invention desirably include lensing devices that pass both visible and IR light.

Figure 3B:
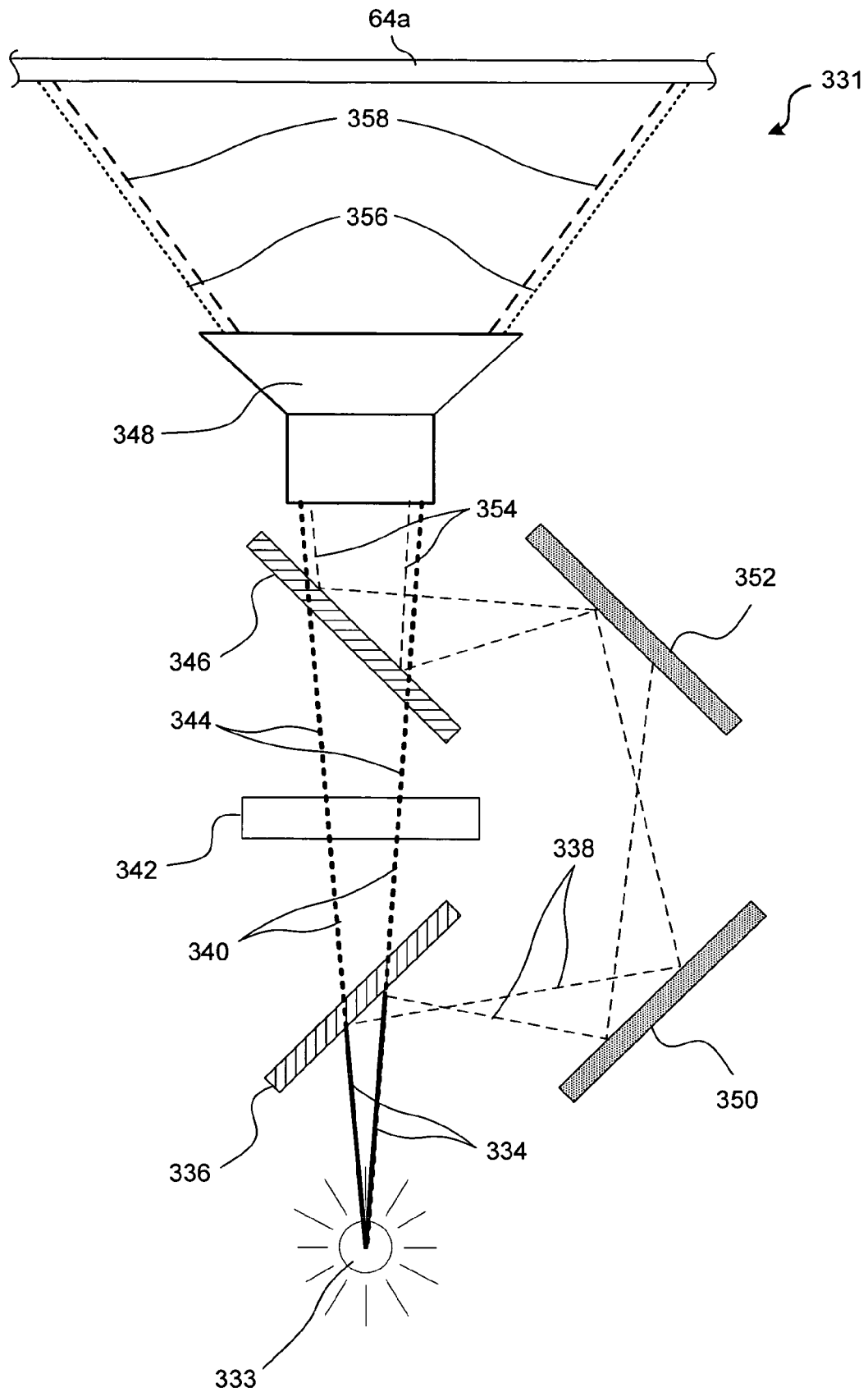

A system 331 in FIG. 3B illustrates another optical system adapted to perform multiple functions in connection with the interactive display table. A light source 333 generates multi-spectral light 334. Multi-spectral light 334 is incident on a hot mirror 336, which reflects IR light 338 and passes visible light 340. Visible light 340 is modulated by a special light modulator 342 that generates modulated visible light 344. Modulated visible light 344 is transmitted through hot mirror 346 toward a lensing device 348. Lensing device 348 focuses modulated visible light 344, produces focused visible light 356, which is projected onto display surface 64a.

IR light 338, redirected by hot mirror 336, is reflected by mirrors 350 and 352 onto hot mirror 346. Hot mirror 346, although freely transmitting modulated visible light 344, reflects IR light 338 as redirected IR light 354 toward lensing device 348. Lensing device 348 desirably thus focuses redirected IR light 354 as distributed IR light 358 over display surface 64a, as well as producing focused visible light 356 that is projected on the display surface.

Figure 3C:
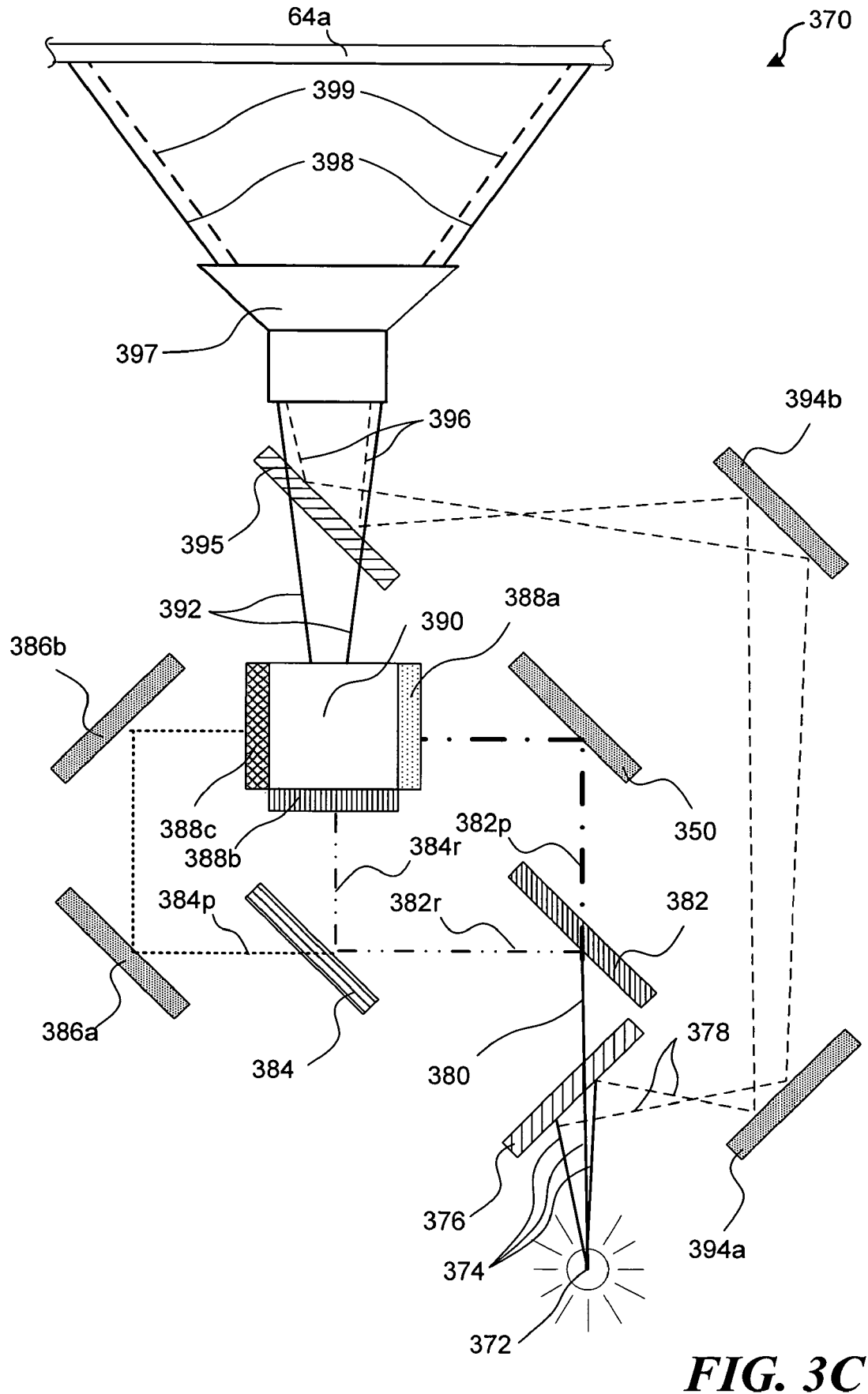

Another exemplary embodiment including a plurality of spatial light modulators, which is illustrated as a system 370 in FIG. 3C, is also usable in the interactive display table. Multiple spatial light modulators are desirable in achieving high-resolution graphics, because simultaneous modulation of separate wavebands of light effectively increases the refresh rate of the resulting image, yielding a clearer picture without noticeable flicker.

System 370 includes a light source 372 generating multi-spectral light 374. Multi-spectral light 374 reaches a hot mirror 376, which reflects IR light 378 and transmits or passes visible light 380. Visible light 380 is incident on a bandpass mirror 382. Like hot mirror 376, bandpass mirror 382 is configured to pass certain wavebands of visible light while redirecting other wavebands of visible light. Thus, for example, bandpass mirror 382 passes a first visible light component 382p which, if bandpass mirror 382 is configured as a low pass filter, includes red light.

First visible light component 382p is reflected by a mirror 350 to a first spatial light modulator 388a. Bandpass mirror 382 reflects remaining light components 382r toward a second bandpass mirror 384. Second bandpass mirror 384 is configured as a high pass filter and transmits a second visible light component 384p, which includes blue light, to a mirror 386a, while reflecting a second remaining light component 384r, which includes green light. Second remaining light component 384r is directed to a second spatial light modulator 388b. Second remaining light component 384p is reflected by mirror 386a to a mirror 386b, which reflects second remaining light component 384p to a third spatial light modulator 388c. Spatial light modulators 388a, 388b, and 388c each selectively modulate the component of visible light directed to them. Modulated visible light components generated by spatial light modulators 388a, 388b, and 388c are combined by collimator 390 to produce a modulated visible light 392. Modulated visible light 392 passes through a hot mirror 395 to reach a lensing device 397. Lensing device 397 focuses modulated visible light 392 to project a focused visible light 398 on display surface 64a.

IR light 378 is reflected by mirrors 394a and 394b to hot mirror 395. Hot mirror 395, which transmitted modulated visible light 392, reflects IR light 378 a redirected IR light 396 that is directed to lensing device 397. Lensing device 397, focuses redirected IR light 396 to project distributed IR light 399 on display surface 64a, thus performs that function in addition to projecting focused visible light 398 on display surface 64a.

Figure 4A:
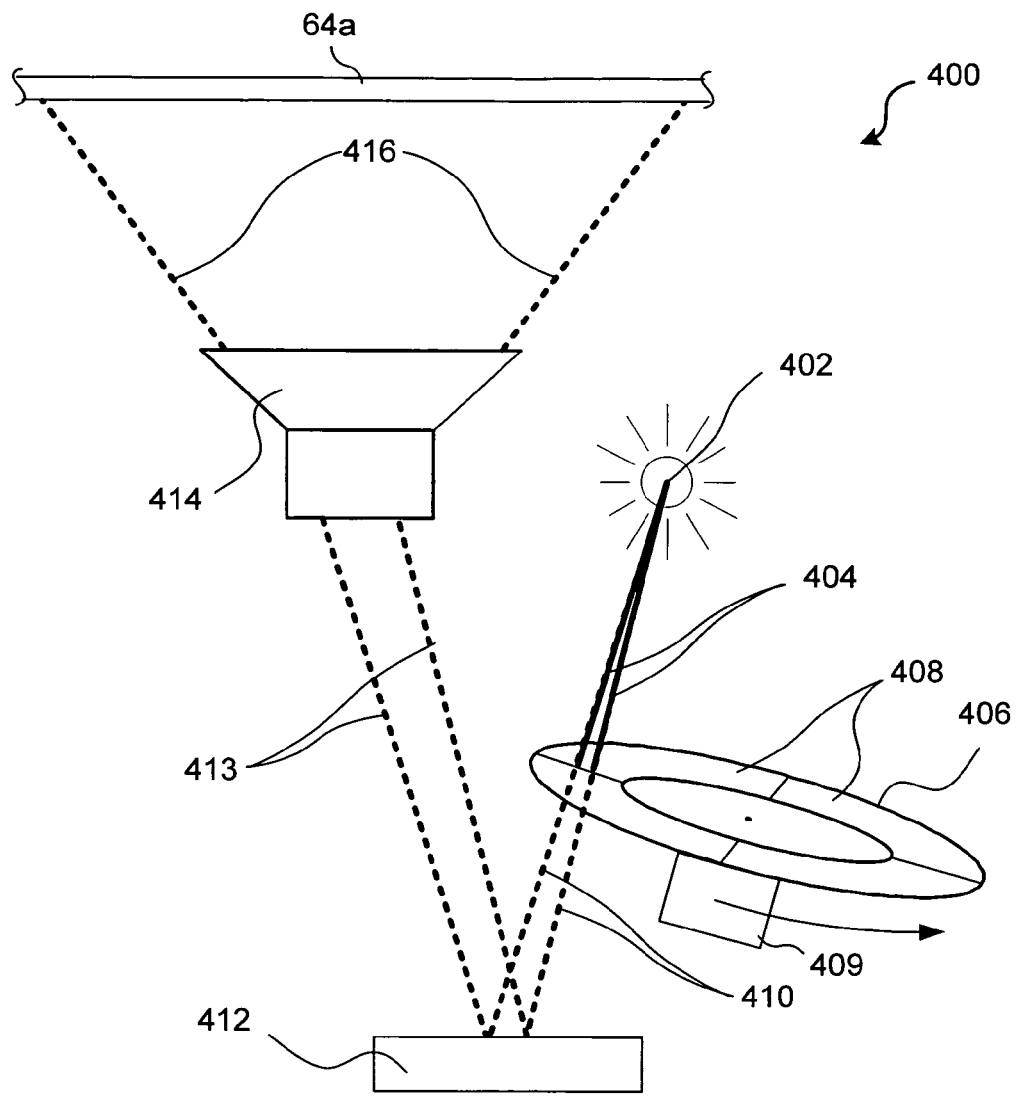
FIGS. 4A-4B illustrate an exemplary mode of interactive display system using a digital micro-mirror device to both project images and evenly distribute IR light over the display surface.

Embodiments of the present invention are also adaptable for use with digital micro-mirror device-type projectors, as shown in an exemplary system 400 in FIG. 4A. System 400 includes a light source 402, which emits multi-spectral light 404. Multi-spectral light 404 is sequentially filtered by a rotating filter wheel 406. Rotating filter wheel 406 includes a plurality of filter areas 408, each of which passes a different waveband of light, and is driven by a prime mover 409, e.g., a small electric motor. The rotating filter wheel thus sequentially passes one of filter areas 408 through multi-spectral light 404, so that in sequence, different spectral component of the light are transmitted while other spectral components are blocked.

Figure 4B:
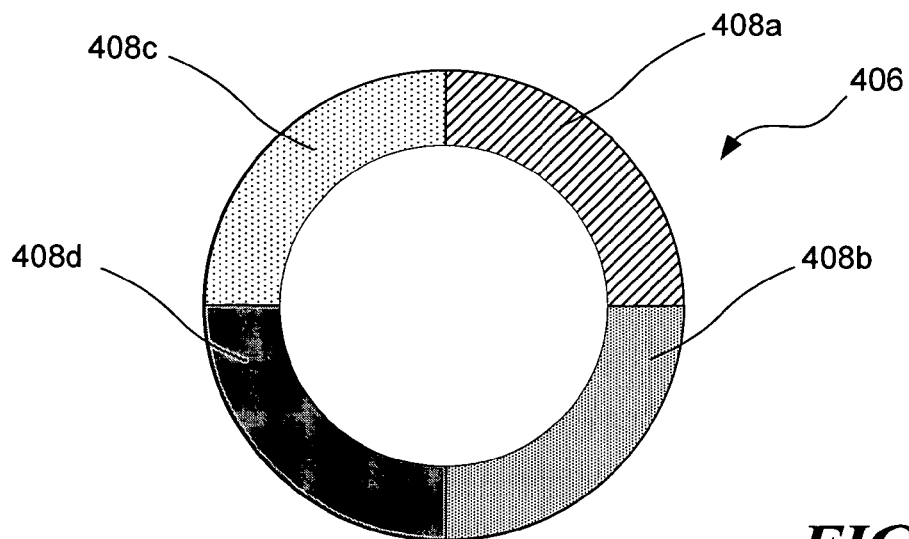

Rotating filter wheel 406 is illustrated in greater detail in FIG. 4B. According to the illustrated embodiment, rotating filter wheel 406 includes a red filter area 408a, a blue filter area 408b, a green filter area 408c, and an IR filter area 408d. By rotating filter areas 408a-408d through multi-spectral light 404 (as shown in FIG. 4A), all desired visible light components, as well as an IR light component, are sequentially transmitted without having to create a redirected IR light path as described in the foregoing exemplary embodiments.

Referring again to FIG. 4A, passing a multi-spectral light 404 through rotating filter wheel 406 generates sequentially filtered light 410. Sequentially filtered light 410 is incident on a digital micro-mirror device 412. Digital micro-mirror device 412 is synchronized with rotating filter wheel 406, so that as a particular component of sequentially filtered light 410 reaches digital micro-mirror device 412, individual mirrored cells are activated to selectively reflect desired portions of sequentially filtered light 410. Thus, for example, certain individual mirrored cells may be activated to produce red, green, and blue pixels on display surface 64a, for creating a multicolor image. In addition to creating a multicolor image, in this exemplary embodiment, when rotating filter wheel 406 is positioned so as to transmit IR light toward digital micro-mirror device 412, all individual mirrored cells of the digital micro-mirror device are activated to reflect IR light as modulated light 413. Digital micro-mirror device 412 thus produces modulated light 413, which includes visible and IR components at different times. Modulated light 413 is directed toward a lensing device 414, which focuses all of the time varying components of modulated light 413 to project focused modulated light and IR light 416 on display surface 64a. The modulation rate is sufficiently fast so that the human eye sees a multicolor image projected onto the display surface.

Embodiment Using the Same Optical System to Project Images and Receive IR Light

Figure 5A:
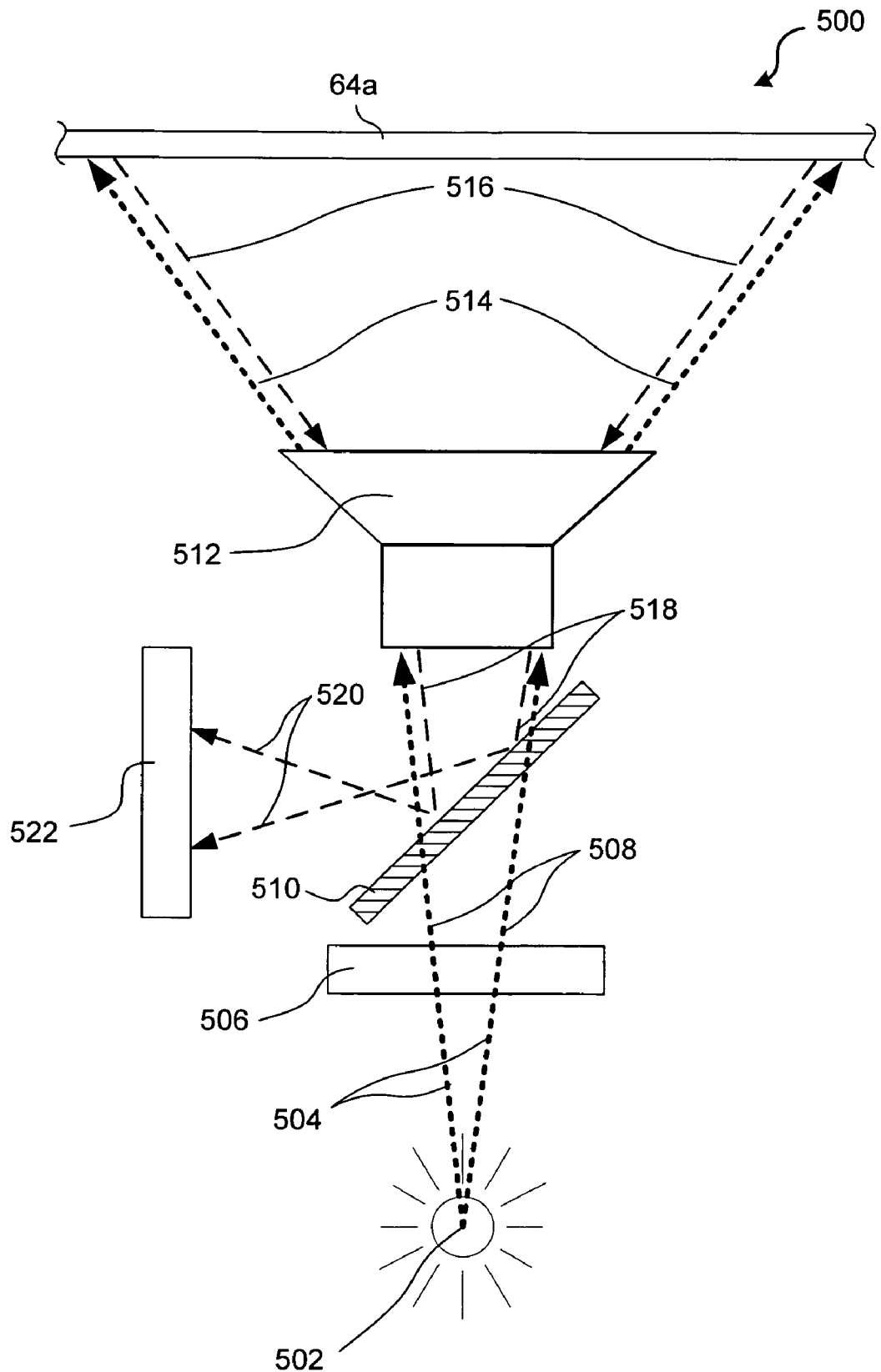
FIGS. 5A-5B illustrate exemplary modes of a display surface in which optical systems used to both project images on the display surface and to image the display surface to detect potential inputs.
Figure 5B:
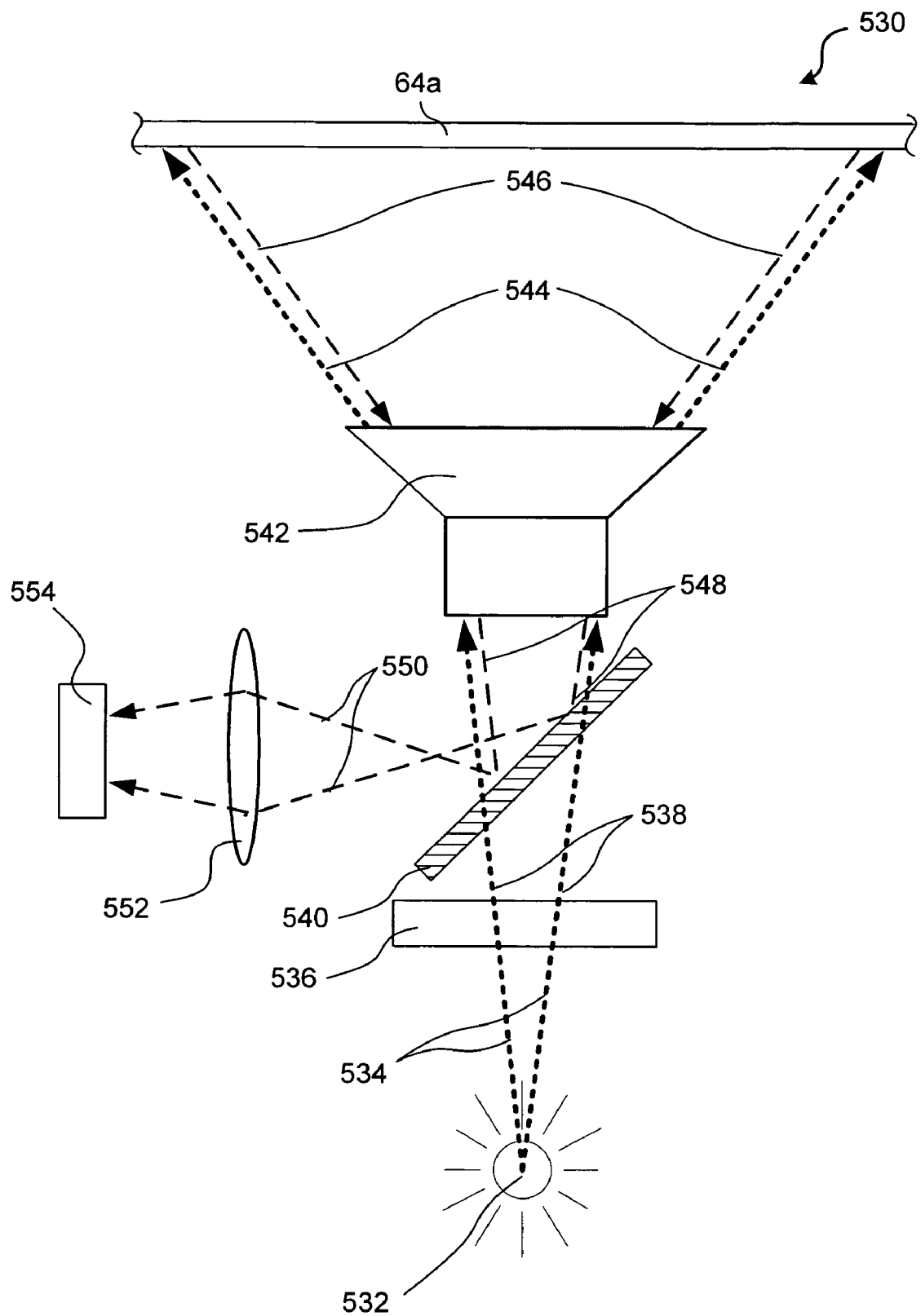

Embodiments also can receive IR light through a lensing device while using that same lensing device to project visible light, as shown in FIGS. 5A and 5B. A system 500 in FIG. 5A includes a light source 502, which produces visible light 504. Visible light 504 is modulated by a spatial light modulator 506 to yield a modulated visible light 508. Modulated visible light 508 is transmitted through a hot mirror 510 toward a lensing device 512. Lensing device 512 focuses modulated visible light 508, projecting a focused visible light 514 onto display surface 64a.

At the same time, IR light 516 that has been reflected from an object on or above display surface 64a passes through the display surface and is incident on lensing device 512. Just as lensing device 512 focuses and distributes modulated visible light 508 for projection onto display surface 64a, lensing device 512 also collects and focuses IR light 516, producing focused IR light 518 that is directed toward hot mirror 510. Hot mirror 510 reflects focused IR light 518 as light 520 directed toward an IR sensor 522 (e.g., a video camera or, an array of charge coupled devices (CCDs), or other appropriate imaging device) that produces a corresponding image of the object from which the IR light was reflected.

An exemplary system 530 of FIG. 5B illustrates a similar embodiment that allows for use of IR sensors having different die sizes. System 530 includes a light source 532, which produces visible light 534. Visible light 534 is modulated by a spatial light modulator 536 that produces a modulated visible light 538. Modulated visible light 538 is transmitted through a hot mirror 540 and toward a lensing device 542. Lensing device 542 focuses the visible light, producing a modulated visible light 538 that is projected as a focused visible light 544 onto display surface 64a.

At the same time, IR light 546 reflected from an object adjacent to display surface 64a passes through the display surface and is incident on lensing device 542. Lensing device 542 collects and focuses IR light 546 that is received, producing a focused IR light 548 that is directed toward hot mirror 540. Hot mirror 540 reflects focused IR light 548 producing redirected light 550 that is directed through lens 522. Lens 522 adjusts the focus of focused IR light 548 to an appropriate die size for an IR sensor 554. Thus, adding an additional lens 552 enables both the projecting of visible light and the imaging of reflected IR light using lensing device 542, for different die size that may be used by different IR sensors.

Figure 6:
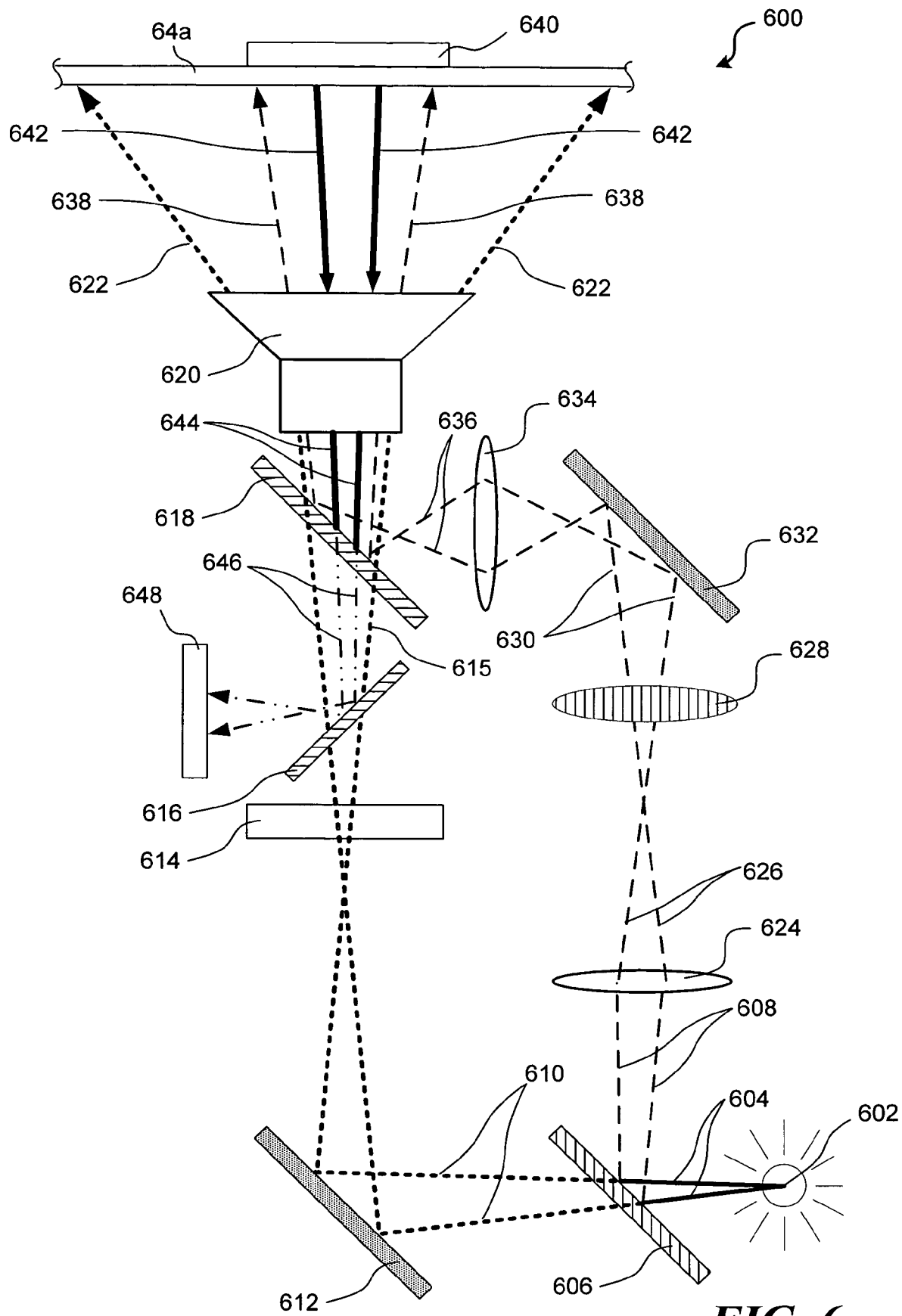
FIG. 6 illustrates an exemplary mode of a display surface in which a single optical system is used to project images on the display surface, distribute IR light over the display surface, and image the interactive display.

Using the Same Optical System to Project Images and Distribute and Collect IR Light An exemplary system 600 in FIG. 6 performs three functions: projecting visible light images on display surface 64a, distributing IR light over display surface 64a to facilitate detection of user input and/or objects adjacent to the display surface, and collecting IR light reflected from an object employed for user input and/or from others disposed adjacent to display surface 64a. System 600 includes a light source 602 that produces multi-spectral light 604 including light in both the visible and IR spectra. Multi-spectral light 604 is incident on a hot mirror 606. Hot mirror 606 reflects IR light 608 while transmitting visible light 610. Visible light 610 transmitted by hot mirror 606 is reflected by a mirror 612 toward a spatial light modulator 614. A modulated visible light 615 produced by spatial light modulator 614 is transmitted through a hot mirror 616. Hot mirror 616 transmits modulated visible light 615 to a polarized hot mirror 618. The function of polarized hot mirror 618 is further explained below. Modulated visible light 615 is transmitted through polarized hot mirror 618 to a lensing device 620. Lensing device 620 focuses modulated visible light 615, producing focused visible light 622 that is projected onto display surface 64a.

IR light 608 reflected by hot mirror 606 is, optionally (as necessary), focused by a lens 624 that desirably controls the dispersion of IR light 308 and transmits a focused IR light 626. Focused IR light 626 is directed to a polarizer 628, which complements polarized hot mirror 618. Specifically, polarizer 628 transmits polarized IR light 630, which is thereby polarized to be reflected by a mirror 632 through a lens 634. Thus, resulting polarized IR light 636 does not pass through the polarization of hot mirror 618. Polarized IR light 630 is thus reflected by hot mirror 618 toward lensing device 620, which desirably focuses polarized IR light 630, producing a distributed IR light 638 directed toward and evenly illuminating display surface 64a.

Distributed IR light 638 illuminates a physical object 640 disposed adjacent to display surface 64a. Physical object 640 returns reflected IR light 642. Reflected IR light 642 is scattered upon reflection the physical object, even though physical object 640 was illuminated with polarized IR light.

Reflected IR light 642 is collected by lensing device 620, which produces a focused IR light 644 directed toward hot mirror 618. Hot mirror 618 allows a portion of focused received IR light 644 to be transmitted. Because reflected IR light 642 will be at least partially scattered and not completely polarized, not all of it will be reflected by the polarization of hot mirror 618. Thus, the use of polarizer 628 and hot mirror 618 having a polarization property both enables IR light to be redirected around the spatial light modulator while enabling at least a portion of the IR light reflected and scattered by the physical object to be transmitted.

Hot mirror 616 reflects scattered IR light 646 that was not blocked by polarized hot mirror 618. The scattered IR light is reflected by hot mirror 616 toward IR sensor 48, which produces an output signal corresponding to the image of physical object 640.

Scanning Mirror Embodiment

FIG. 9 illustrates another embodiment of a system 900 that uses from one to three lasers (depending upon whether the image appearing on display surface 64a is to be from monochrome to full color) and either a 2D scanning mirror or two 1D scanning mirrors to both produce an image on the display surface and receive IR light reflected from an object 910 that is proximate to the display surface. In the illustrated embodiment of system 900, a red laser 912, a green laser 914, and a blue laser 916 are modulated as a function of the pixel position of the scanning light beam that is illuminating display surface 64a. The light produced by these three laser 912, 914, and 916, as well as IR light from an IR laser 918 are directed by selectively reflective mirrors 922, 924, and 926 toward a scanning mirror 928 that is driven to scan in 2D over display surface 64a by a scanning driver 930. Selective reflecting mirror 922 reflects red light, but transmits all other wavebands of light; selective reflecting mirror 924 reflects green light, but transmits all other wavebands of light; and selective reflective mirror 926 reflects blue light, but transmits all other wavebands of light. As a scanned light beam 932 rapidly moves over displays surface 64a, the modulated contribution of these three differently colored lasers produces a corresponding image on the display surface. In addition, IR light from IR laser 918 is transmitted through a mirror 920 and each of the three selective reflective mirrors and is thus included within scanned light beam 932. Visible and IR light are thus included within light beam 936 that is directed toward the display surface, while light reflected from any object on the display surface comprises a light beam 938 that travels from the display surface toward the scanning mirror and back through the three selective reflecting mirrors. However, mirror 920 is configured to reflect the returning IR light toward a photodiode sensor 934, which produces a signal corresponding to the IR intensity of light reflected back from each successive pixel position on the display surface as the scanning mirror is scanned over that position. Accordingly, the system can produce an image of objects on the display surface based on the IR light reflected therefrom during the scan of the entire display surface. System 900 thus provides the same benefit of producing an image on the display surface using most of the same optical components employed to image objects that are proximate to the display surface.

Physical Advantage of Combining Optical Systems

Figure 7:
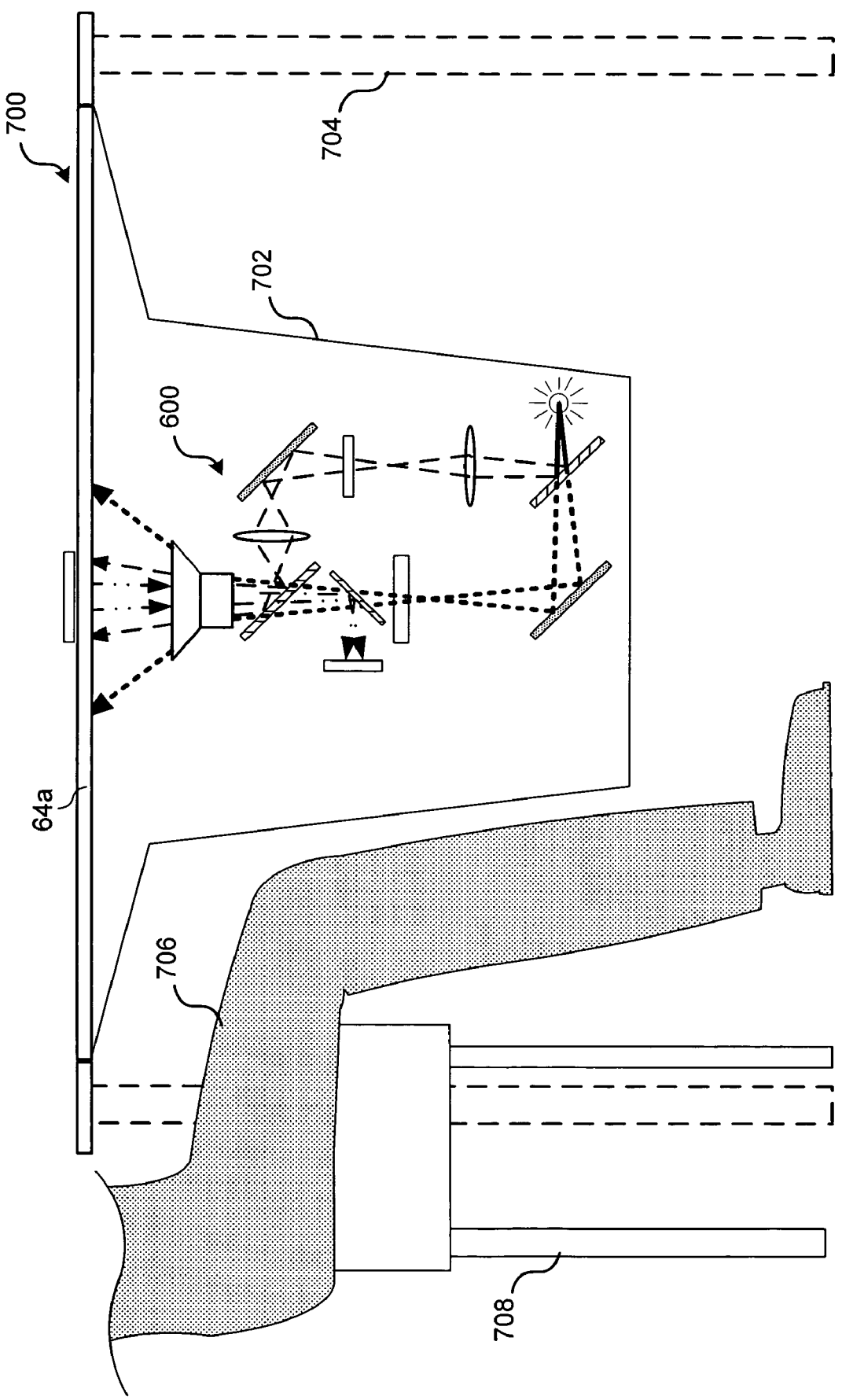
FIG. 7 is a cutaway view of an exemplary interactive display table illustrating advantages of using the exemplary mode of the display surface of FIG. 6.

FIG. 7 shows an interactive display table 700 and illustrates an advantage of using a single optical system for multiple functions. The system of FIG. 1A used multiple optical systems and thus, multiple optical paths to facilitate operation of the video projector, IR source, and video camera. Interactive display table 700 uses system 600 of FIG. 6. By combining the optical paths for the three functions that it performs, the single optical system consumes less space. Thus, interactive display table 700 may be mounted on legs 704 that enable a user's legs 706 to slide beneath display surface 64a, while the user is seated on a chair or stool 708 that is next to sides 702 of the interactive display table. Thus, the user may be able to more comfortably interact with interactive display table 700 than if unable to sit with the legs partially disposed beneath the interactive display table.

Methods for Combining Projection of Images with Distribution/Collection of IR Light In FIG. 8A, a flow diagram 800 illustrates logical steps for combining projection of images and distribution of IR light. Flow diagram 800 begins at a step 802. At a step 804, illumination is produced by a multi-spectral light source. At a step 806, the IR and visible light components of the multi-spectral light generated by the light source are split. At a step 808, the IR light component is redirected around the spatial light modulator used to modulate the visible light component. At a step 810, the visible light is modulated by the spatial light modulator. At a step 812, the redirected IR light and the modulated visible light are recombined and collimated. At a step 814, the collimated, redirected IR light and modulated visible light are focused on the display surface using the same optics. Flow diagram 800 ends at a step 816.

A flow diagram 820 in FIG. 8B illustrates logical steps for combining projection of images with collection of IR light. Flow diagram 820 begins at a step 822. At a step 824, illumination is produced by a light source. At a step 826, the light is modulated to create one or more images. At a step 828 the modulated light is focused on the display surface to present the one or more images to a user. At a step 830, IR light (reflected from an object) is received from the display surface. At a step 832, the IR light received from the display surface is focused using the same optics used to focus the modulated light to produce the visible image(s). At a step 834, the received IR light is redirected to an IR sensor. Flow diagram 820 ends at a step 836.

Flow diagram 850 illustrates logical steps for combining projection of images with both distribution and collection of IR light. Flow diagram 850 begins at step 852. At step 854, illumination is generated by a multi-spectral light source. At step 856, the IR and visible light components of the multi-spectral light generated by the light source are split. At step 858, the IR light component is redirected around the spatial light modulator used to modulate the visible light component. As described above, the IR light may be redirected using a polarizing system to redirect the IR light around the spatial light modulating system employed to modulate the visible light, without preventing IR light received from an object from being processed using the same optical system.

At a step 860, the visible light is modulated by the spatial light modulator. At a step 862, the redirected IR light and the modulated visible light are recombined and collimated. At a step 864, the collimated, redirected IR light and modulated visible light are focused on the display surface using the same optics. At a step 866, IR light is received from the display surface (i.e., IR light reflected from an object adjacent to the displays surface). At a step 868 the IR light received from the display surface is focused using the same optics employed to focus the modulated light. At a step 870, the received IR light is redirected to an IR sensor. Flow diagram 850 ends at a step 872.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A system for directing light in an interactive display system, the interactive display system including a generally transparent planar panel having a first surface on which visible images are projected and a second surface opposite the first surface, proximate to which a user interaction with an object occurs to provide an input to the interactive display system, comprising:
   (a) a lensing device operable to focus a predominantly visible light output to project an image over the first surface and at least one of:
   (i) distribute a predominantly non-visible light output over the first surface; and
   (ii) focus non-visible light reflected from an object adjacent to the second surface, to a focal input of a light sensor;
   (b) a light separating system operable to separate at least one of:
   (i) an input light so that the input light are separated into a predominantly visible light input and a predominantly non-visible light input, the predominantly visible light input being selectively modulated by a modulating system to produce a predominantly visible light output directed to the lensing device, at least a portion of the predominantly non-visible light input being directed to the lensing device as a predominantly non-visible light output; and
   (ii) predominantly non-visible received light reflected from the object, from received light, such that substantially only the predominantly non-visible light reflected from the object adjacent to the second surface is routed to the light sensor; and
   (c) at least one polarizing device disposed to cause only a substantially polarized component of the predominantly non-visible light output to be transmitted through the lensing device while passing at least a portion of the predominantly non-visible light that is reflected from the object and polarized but not in a same plane as the substantially polarized component of the substantially non-visible light output.

2. The system of claim 1, wherein the light separating system includes a first beam splitting device, the first beam splitting device being configured to substantially redirect at least a portion of the predominantly non-visible light input reaching the first beam splitting device while transmitting at least a portion of the predominantly visible light input.

3. The system of claim 2, wherein the light separating system includes:
   (a) a plurality of reflecting devices operable to substantially redirect the portion of the predominantly non-visible light input redirected by the first beam splitting around the modulating system; and
   (b) a second beam splitting device that is operable to substantially redirect the portion of the predominantly non-visible light input received from the plurality of reflecting devices through the lensing device, as the predominantly non-visible light output, while substantially transmitting modulated visible light produced by the modulating system through the lensing device.

4. The system of claim 1, wherein the modulating system includes:
   (a) a light color splitting device operable to divide the predominantly visible light input into a plurality of color components and direct each of the plurality of color components to a corresponding spatial light modulator device;
   (b) wherein each corresponding spatial light modulator device includes one of:
   (i) a transmissive liquid crystal display;
   (ii) a grating light valve;
   (iii) a digital micro-mirror device; and
   (iv) a liquid crystal on silicon (LCoS) device; and
   (c) a beam combiner configured to receive a plurality of modulated color components resulting from modulation of each of the plurality of color components, combine the plurality of modulated color components to form the predominantly visible light output, and pass the collective image beam to the lensing device for distribution with the predominantly non-visible light input over the first surface.

5. The system of claim 1, further comprising at least one secondary lensing device configured to adjust a projected area of the predominantly non-visible light reflected from an object, to match a die size of the image sensor.

6. The system of claim 1, wherein the lensing device includes at least one optical coating configured to substantially transmit spectra of light including the predominantly visible light output and at least one of:
   (a) the predominantly non-visible light output; and
   (b) at least a spectral portion of the predominantly non-visible light, reflected from an object that includes at least a portion of a spectrum of the predominantly non-visible light output.

7. A system for directing and modulating light in an interactive display system, the interactive display system including a generally transparent planar panel having a first surface on which visible images are projected and a second surface opposite the first surface, proximate to which a user interaction with an object occurs to provide an input to the interactive display system, comprising:
   (a) a shared lensing device operable to:
   (i) focus a predominantly visible light output to project an image over the first surface and at least one of:
   (ii) distribute a predominantly non-visible light output over the first surface; and
   (iii) focus a received light that was reflected from an object adjacent to the second surface, the received light being focused to be receivable by a light sensor;
   (b) a separating system operable to:
   (i) separate an input light into a predominantly visible light input and a predominantly non-visible light input, such that the predominantly visible light input is selectively modulated by a modulating system to generate the predominantly visible light output directed to the shared lensing device, and at least a portion of the predominantly non-visible light input is directed to the shared lensing device as the predominantly non-visible light output; and
   (ii) separate the received light, such that only the predominantly non-visible light reflected by the object is routed to the light sensor; and
   (c) at least one polarizing device positioned to cause only a substantially polarized component of the predominantly non-visible light output to be transmitted through the lensing device while passing at least a portion of the predominantly non-visible received light that is polarized but not in a same plane as a substantially polarized component of the predominantly non-visible light output.

8. The system of claim 7, wherein the separating system includes a first beam splitting device, the first beam splitting device being configured to substantially redirect at least a portion of the predominantly non-visible light input reaching the first beam splitting device, while transmitting at least a portion the predominantly visible light input.

9. The system of claim 8, wherein the separating system includes:
   (a) a plurality of reflecting devices operable to substantially redirect the portion of the predominantly non-visible light input that is redirected by the first beam splitting device around the modulating system; and
   (b) a second beam splitting device operable to substantially redirect the portion of the predominantly non-visible light input redirected by the plurality of reflecting devices through the shared lensing device as the predominantly non-visible light output, while substantially transmitting modulated visible light generated by the modulating system through the shared lensing device as the predominantly visible light output.

10. The system of claim 8, wherein the modulating system includes:
    (a) a light color splitting device operable to divide the predominantly visible light input into a plurality of color components and direct each of the plurality of color components to a corresponding spatial light modulator device;
    (b) wherein each corresponding spatial light modulator device includes one of:
        (i) a transmissive liquid crystal display;
        (ii) a grating light valve;
        (iii) a digital micro-mirror device; and
        (iv) a liquid crystal on silicon (LCoS) device; and
    (c) a beam combiner configured to receive a plurality of modulated color components resulting from modulation of each of the plurality of color components, combine the plurality of modulated color components into the predominantly visible light output, and pass the collective image beam to the shared lensing device to distribute with the predominantly non-visible light output, over the first surface.

11. The system of claim 7, wherein the modulating system includes:
    (a) a dynamic light separating device operable to sequentially divide the input light into the predominantly non-visible light input and a plurality of color components comprising the predominantly visible light input; and
    (b) a single spatial light modulator operable to receive the predominantly non-visible light input and the plurality of color components, substantially direct the predominantly non-visible light input to the lensing device, and selectively modulate the plurality of color components producing a plurality of modulated color components that are directed to the lensing device as the predominantly visible light output, the single spatial light modulator including one of:
        (i) a transmissive liquid crystal display;
        (ii) a grating light valve;
        (iii) a digital micro-mirror device; and
        (iv) a liquid crystal on silicon (LCoS) device.

12. A method for directing light in an interactive display system, the interactive display system including a generally transparent planar panel having a first surface on which visible images are projected and a second surface opposite the first surface, proximate to which a user interaction with an object occurs to provide an input to the interactive display system, comprising the steps of:
    (a) using a shared lensing device, focusing a predominantly visible light output to project an image over the first surface and at least one of:
        (i) distributing a predominantly non-visible light output over the first surface; and
        (ii) focusing a received light reflected from an object adjacent to the second surface to a focal input of a light sensor;
    (b) separating at least one of:
        (i) an input light into a predominantly visible light input and a predominantly non-visible light input, the predominantly visible light input being then modulated to generate the predominantly visible light output, at least a portion of the predominantly non-visible light input being used for the predominantly non-visible light output; and
        (ii) predominantly non-visible received light reflected from the object, from received light, routing the predominantly non-visible received light to the light sensor; and
    (c) polarizing the predominantly non-visible light input directed to the shared lensing device, so that the predominantly non-visible received light, which is polarized differently because of scattering, is directed to the image sensor.

13. The method of claim 12, wherein separating the input light includes substantially transmitting at least a portion of the predominantly visible light to be selectively modulated to form the predominantly visible light output, while redirecting at least a portion of the predominantly non-visible light input to avoid modulating the predominantly non-visible light.

14. The method of claim 12, further comprising the steps of:
    (a) splitting the predominantly visible light input into a plurality of color components;
    (b) selectively modulating each of the plurality of color components.

15. The method of claim 12, further comprising the step of refocusing the predominantly non-visible received light to correspond with an image size of the image sensor.

16. The method of claim 12, further comprising the step of configuring the shared lensing device to substantially transmit spectra of light including the predominantly visible light output and at least one of:
    (a) the predominantly non-visible light output; and
    (b) at least a spectral portion of the received light, the spectral portion of the received light including at least a portion of a spectrum of the predominantly non-visible light output.

* * * * *